(12) United States Patent
Van Huben et al.

(10) Patent No.: US 6,327,594 B1
(45) Date of Patent: Dec. 4, 2001

(54) METHODS FOR SHARED DATA MANAGEMENT IN A PERVASIVE COMPUTING ENVIRONMENT

(75) Inventors: Gary A. Van Huben; Joseph L. Mueller, both of Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/240,732

(22) Filed: Jan. 29, 1999

(51) Int. Cl.[7] .................................................. G06F 17/30

(52) U.S. Cl. ................................ 707/200; 707/10; 707/8

(58) Field of Search ............................... 707/200, 10, 8, 707/102, 1, 101, 100, 103, 4, 205, 202; 345/339; 705/8

(56) References Cited

U.S. PATENT DOCUMENTS

| | | | |
|---|---|---|---|
| 5,201,047 | 4/1993 | Maki et al. | 707/4 |
| 5,321,605 | 6/1994 | Chapman et al. | 705/7 |
| 5,418,949 | 5/1995 | Suzuki | 707/205 |
| 5,724,575 | * 3/1998 | Hoover et al. | 707/10 |
| 5,787,437 | * 7/1998 | Potterveld et al. | 707/103 |
| 5,812,130 | 9/1998 | Van Huben et al. | 345/339 |
| 5,826,265 | 10/1998 | Van Huben et al. | 707/8 |
| 5,864,875 | * 1/1999 | Van Huben et al. | 707/200 |
| 5,878,408 | * 3/1999 | VanHuben et al. | 707/1 |
| 5,920,867 | * 7/1999 | Van Huben et al. | 707/101 |
| 5,995,969 | * 11/1999 | Lee et al. | 707/100 |

OTHER PUBLICATIONS

Tegel, O., "Integrating Human Knowledge Into the Product Development Process," Engineering Data Management: Integrating the Engineering Enterprise ASME 1994, pp. 93–100.

* cited by examiner

Primary Examiner—Sanjiv Shah
(74) Attorney, Agent, or Firm—Lynn L. Augspurger

(57) ABSTRACT

A common access method is disclosed to enable disparate pervasive computing devices to interact with centralized data management systems. A modular, scalable data management system is envisioned to further expand the role of the pervasive devices as direct participants in the data management system. This data management system has a plurality of data managers and is provided with a plurality of data managers in one or more layers of a layered architecture. The system performs with a data manager and with a input from a user or pervasive computing device via an API a plurality of process on data residing in heterogeneous data repositories of computer system including promotion, check-in, check-out, locking, library searching, setting and viewing process results, tracking aggregations, and managing parts, releases and problem fix data under management control of a virtual control repository having one or more physical heterogeneous repositories. The system provides for storing, accessing, tracking data residing in said one or more data repositories managed by the virtual control repository. DMS applications executing directly within, on or behalf of, the pervasive computing device organize data using the PFVL paradigm. Configurable managers include a query control repository for existence of peer managers and provide logic switches to dynamically interact with peers. A control repository layer provides a common process interface across all managers. A command translator performs the appropriate mapping of generic control repository layer calls to the required function for the underlying storage engine.

18 Claims, 18 Drawing Sheets

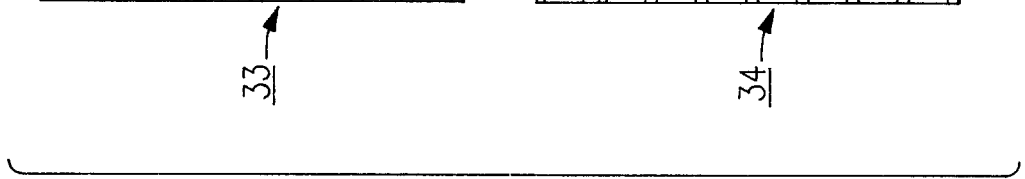

| FILENAME | FILETYPE | PACKAGE | LEVEL | VARIANCE | VERSION |
|---|---|---|---|---|---|
| MPEG | SCHEM | DSGN_LIB | TEST | USB | 1.23 |
| MPEG | SCHEM | DSGN_LIB | TEST | USB | 1.22 |
| MPEG | SCHEM | DSGN_LIB | PROD | USB | 1.04 |
| MPEG | VHDL | DSGN_LIB | PROD | USB | 2.56 |
| MPEG | LAYOUT | CIRCUITS | REL1 | LOW_VLT | 5 |
| MPEG | SCHEM | DSGN_LIB | PROD | PCI | 2.56 |
| BUS_CTL | SCHEM | DSGN_LIB | PROD | PCI | 3.21 |

33

| FILENAME | FILETYPE | PACKAGE | LEVEL | VARIANCE | VERSION |
|---|---|---|---|---|---|
| H2OPUMP | SCHEM | COOLING | QA1 | BOTH | 13 |
| MICRCTL | SCHEM | COOLING | QA2 | TAURUS | 4 |
| MICRCTL | LAYOUT | COOLING | QA2 | TAURUS | 21 |
| MICRCTL | LAYOUT | COOLING | QA2 | SABLE | 6 |
| FUEL_INJ | SCHEM | ENGINE | QA1 | BOTH | 16 |
| ROM | UCODE | ENGINE | QA2 | SABLE | 34 |
| ENGINE | SCHEM | ELEMECH | QA2 | SABLE | 26 |

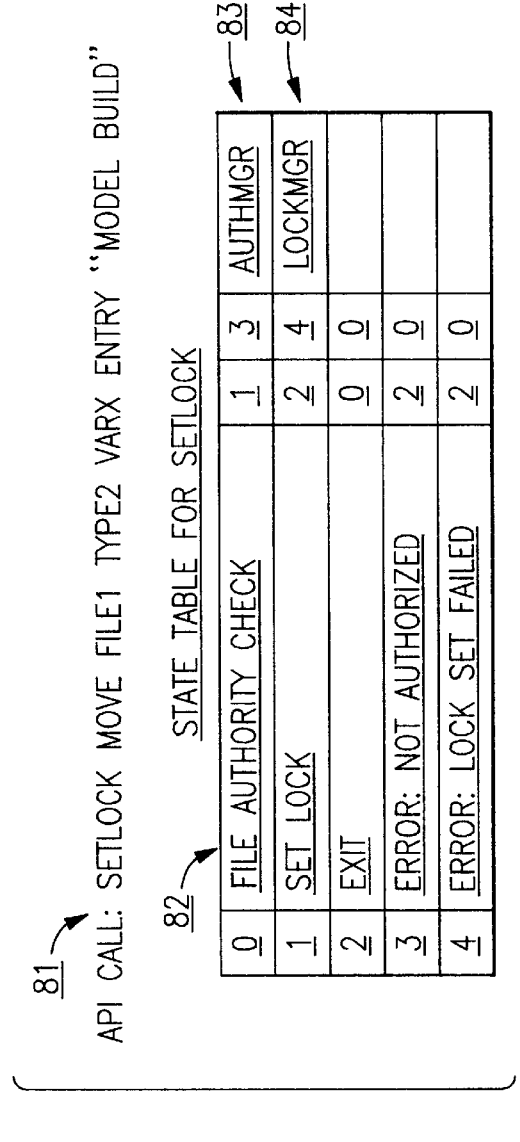

| 44 → | | | | | | |
|---|---|---|---|---|---|---|
| NAME | TYPE | PACK | LVL | VAR | VERSION METHOD | LOCATION |
| * | VHDL | MPEG | TEST | USB | RCS | /DATA/MPEG/VHDL/TEST |
| * | VHDL | MPEG | PROD | USB | SHERPA | /DATA/MPEG/VHDL/PROD |
| * | LAYOUT | MPEG | REL_1 | BASE | NONE | $PROJ/MPEG/BASE/REL_1 |
| * | DOC | MPEG | * | *I | BASIC | HTTP://WWW.MPEG.DOC |

FIG.4B

81 → API CALL: SETLOCK MOVE FILE1 TYPE2 VARX ENTRY "MODEL BUILD"

82 → STATE TABLE FOR SETLOCK

| | FILE AUTHORITY CHECK | | AUTHMGR 83 |
|---|---|---|---|
| 0 | FILE AUTHORITY CHECK | 1 | 3 |
| 1 | SET LOCK | 2 | 4 |
| 2 | EXIT | 0 | 0 |
| 3 | ERROR: NOT AUTHORIZED | 2 | 0 |
| 4 | ERROR: LOCK SET FAILED | 2 | 0 |

(second value column header: LOCKMGR 84)

FIG.8

AUTHMGR CRI CALL: /—91
    CRIFATGET USERA LOCK MOVE FILE 1 TYPE2 VARX ENTRY

SELECT COUNT(*) FROM FILE_AUTHORITY WHERE
92—    USERID=USERA AND DOMAIND=LOCK AND
        NAME=MOVE AND FILENAME=FILE1 AND
        FILETYPE=TYPE2 AND VARIANCE=VARX AND
        LEVEL=ENTRY

LOCKMGR CRI CALL: /—93
    CRILOCKSET USERA LOCK MOVE FILE1 TYPE2 VARX ENTRY "MODEL BUILD"

UPDATE REFIDS SET LASTID=LASTID+1
        WHERE TNAME=LOCKS    \—94

SELECT LASTID INTO REF FROM REFIDS
        WHERE TNAME=LOCKS
                      >—94

INSERT INTO LOCKS
        (REF,DOMAIN,FILETYPE,VARIANCE,LEVEL,FILENAME,
        LOCKNAME,LOCKERID,DATE,TIME,REASON)
        VALUES(REF,LOCK,TYPE2,VARX,ENTRY,FILE1,MOVE,USERA,
        1996052237,093921,"MODEL BUILD")

FIG.9

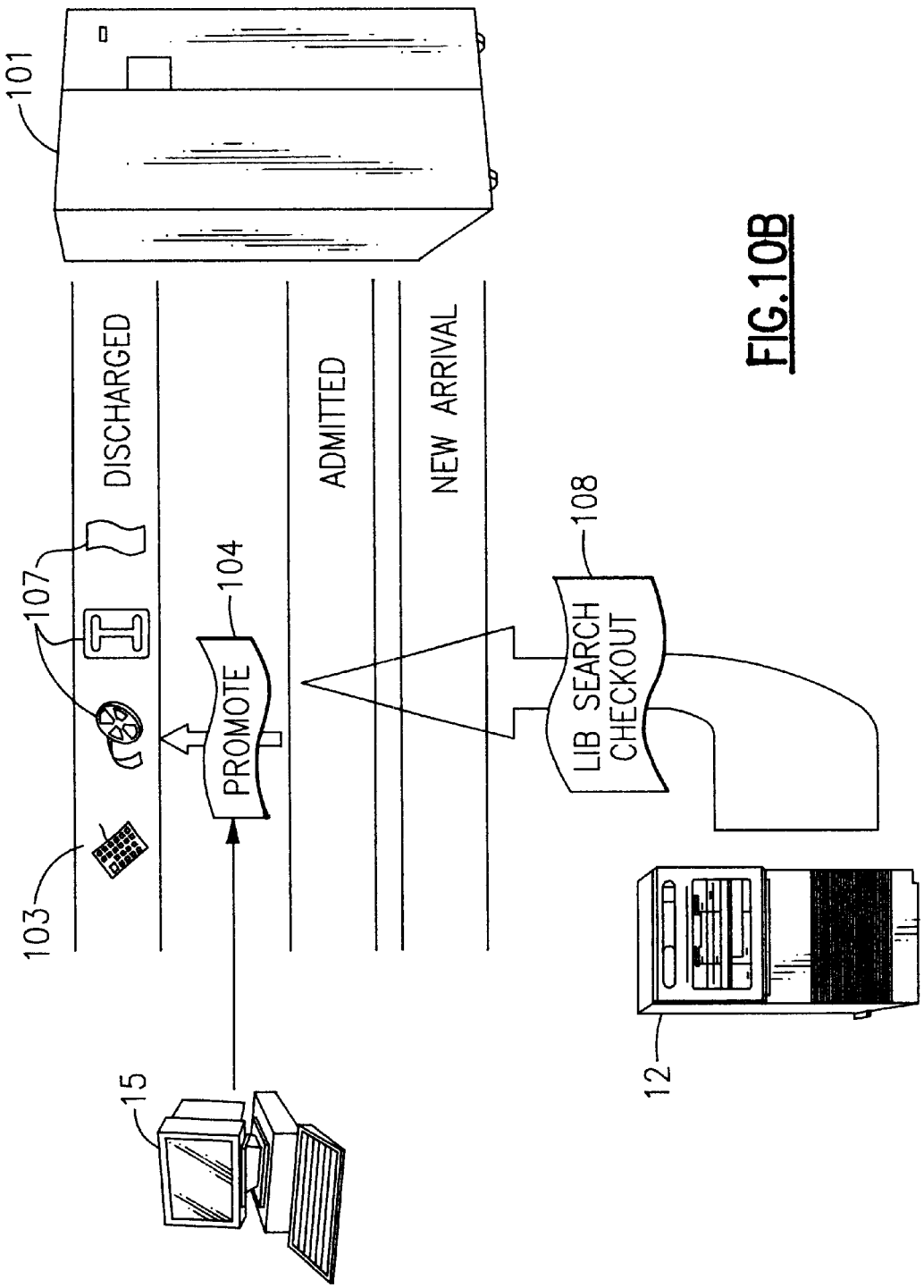

| NAME | PART#/ MODEL# | LIBRARY | LEVEL | REF#/ REVISION | TYPE |
|---|---|---|---|---|---|
| 1/8" BOLT | 65438733 | PARTS | INVENTORY | 7600938 | INVOICE |
| SWITCH | 789AB | PARTS | INVENTORY | 3200493 | INVOICE |
| MOTOR | 4628479 | DESIGN | RELEASE1 | 1.27 | SCHEMATIC |
| TIMER | JB228475 | DESIGN | RELEASE2 | 3.23 | SCHEMATIC |
| VCR | 5660 | DESIGN | RELEASE2 | 1.1.2.3 | SCHEMATIC |

METHODS FOR SHARED DATA MANAGEMENT IN A PERVASIVE COMPUTING ENVIRONMENT

FIELD OF THE INVENTION:

This invention is related to the management of disparate forms of data generated, captured, transmitted, or otherwise manipulated by pervasive computing devices.

BACKGROUND OF THE INVENTION

With all the advances in computer technology, virtually any machine, appliance or device is capable of generating or collecting vast amounts of data. Additionally, the growing trend towards global data sharing and electronic commerce is creating an environment where large quantities of disparate data exist in a multitude of repositories each having non-uniform access methods. This typically requires data to be imported, exported, translated or even replicated among different data management systems. Consider an example hospital environment where all the data regarding a patient's care is managed by a large database like DB2. Despite the fact that these databases could serve as a single repository for all of the patient's hospital data, they don't. For example, if the patient is being monitored by a heart monitor, the output is usually strip-paper which may or may not wind up in the patient's "paper" folder. If a doctor wants to review the data sometime later, it's cumbersome and at times impossible to locate it. The patient's chart is another example of an important data object which is loosely managed. Every day several members of the hospital staff make updates in the chart, and it's usually done in written form on paper. Once again, accessing this data at a later time, especially by a doctor at a remote location, is cumbersome. Furthermore, one person may be updating the chart while another is trying to access it, unaware that updates are pending. Finally, diagnostic test results such as X-Rays, MRIs, CT-Scans, etc. all contribute to the pile of data compiled into the patient's folder. At some point all of this "paper" and "electronic" data must be referenced to calculate the patient's bill or analyzed by doctors to diagnose problems and prescribe treatment. Upon being discharged, if someone wanted to review all aspects of the patient's hospital stay (diagnostic tests run, test results, daily vital signs, doctor's exam notes, nurses charting notes, billing information, medication administered, etc.), it would undoubtedly require accessing several computer systems plus tracking down several files, papers, and other types of output media.

In another example, a manufacturing company purchases raw materials or parts from vendors and assembles them, along with its own components, into finished products. These products are then marketed, distributed, and sold, possibly to other manufacturers for inclusion into their products. Although recent advances such as e-business and the world wide web have strengthened each link of the vendor-customer chain, the lack of a common organization method have impeded these businesses from sharing data between their computing devices. For instance, one vendor may be using a Windows NT environment for managing their product data. Their employees may use hand-held computing devices running Windows CE to remotely enter information into a Windows NT data management system. Because of the similarity in platforms and operating systems, these hand-held devices can successfully communicate with the data management system. However, a problem arises if a customer is using a Unix or S/390 system for data management and wants to link it to the vendor's DM system. If the goal is to directly exchange data between the vendor's hand-held device and the customers Unix or S/390 DM system, it may be imposesidle due to the incompatibility between the two platforms.

Clearly the need exists for seamless management of data across all facets of the product development cycle, including data residing at different locations worldwide. Furthermore, as noted by Oliver Tegel in "Integrating human knowledge into the product development process" as published in the Proceedings of the ASME Database Symposium, Engineering Data Management: Integrating the Engineering Enterprise ASME Database Symposium 1994, ASCE, New York, N.Y., USA. p 93–100, specialists who are not working directly together are often needed for solving the demanding tasks that arise during the development of today's advanced products. During product development, assistance is required from other departments such as manufacturing, operations scheduling, etc. Even the vendors and customers should be integrated into the product development process to guarantee the product developed will be accepted in the market.

Another example, U.S. Pat. No. 5,201,047 to Maki et al. (issued Apr. 6, 1993) teaches an attribute based classification and retrieval system wherein it is unnecessary to implement an artificial code for indexing classifications. The patent teaches a method for defining unique, user-determined attributes for storing data which are capable of being readily augmented without necessitating the modification of the underlying query used for retrieval thereof. However, the Maki et al. patent requires that the data items being grouped share at least one common attribute to enable the grouping, and therefore fails to address the problems of managing data aggregates formed from disparate and unrelated data objects.

Other data management systems address the creation of data aggregates coupled to particular processes implemented in the data system. For example, U.S. Pat. No. 5,321,605 to Chapman et al. (issued Jun. 14, 1994) teaches the creation of a Bill of Resources table which represents the resources consumed in the performance of a given process. Attribute tables for the given resources are utilized to determine whether additional processes which will consume some or all of the resources of a given process can be initiated. The patent to Chapman et al., requires that each process to be initiated have a particular Bill of Resources aggregate associated therewith. This tightly coupled construct does not permit the creation of data aggregates not related to a particular process implemented in the data management system. Furthermore, since a process must be contemplated in order to create a Bill of Resources table, Chapman et al. do not permit the creation of aggregates without foreknowledge of the process that requires the resource. Thus, in a manner similar to that described for Maki et al., Chapman et al. require that a relationship between the elements exist prior to the formation of the Bill of Resources grouping.

Also, unrelated DMS systems are known which are used for hardware implementations which enable related data in a computer memory, storage or I/O subsystem to be physically grouped in proximity to other such data so as to improve hardware performance, application performance, and/or to solve memory management issues are known. For example, U.S. Pat. No. 5,418,949 to Suzuki (issued May 23, 1995) teaches a file storage management system for a database which achieves a high level of clustering on a given page and teaches loading related data from a secondary storage unit at high speed. The patent uses map files including a metamap file for defining page to page relations of data. These hardware implementations are not related to the present invention, as they involve the management of the physical contents of a data object rather than the management of aggregations of data objects as we perform the methods of our present invention. It is contemplated, however, that such known hardware techniques may be implemented in a system comprising the aggregation management features disclosed herein, thereby further augmenting the overall system efficiency.

During our development process we have viewed the development of others. Even the best of the EDA (electronic design automation) design houses don't have an integrated approach like we have developed.

For the purposes of this background, we will discuss some of the various approaches already used specifically viewing them in light of our own separate developments which we will further elaborate in our detailed description of our invention which follows later in this specification.

In the field of EDA, there are today several leading edge providers of Data Management technology. Among them are Cadence Design Systems, Inc., ViewLogic Inc., and Synchronicity Inc., Of course there are others, but these the companies that have the capability to provide complete data management solutions that encompass all facets of the business process including design, manufacturing, quality control, defect tracking, project management and the like. However, review of their most recent technology still affords the opportunity to make improvements in the area of scalability, modularity and adaptation of disparate environments into a seamless Data Management enterprise.

Historically many attempts have been made to manage and share data across groups of users or teams. This has typically resulted in systems that assume a particular use model and expect the users to mold their process or methodology around it. Furthermore, these systems tend to either be a closed architecture which is difficult to enhance or customize. In addition these systems can be large and complex, and lacking the ability to scale from a small team of "low-end" users to a large group of sophisticated "high-end" users. U.S. Pat. No. 5,812,130, entitled "Data Management System and Method for Concurrent Engineering", and U.S. Pat. No. 5,826,265 entitled "Data Management System Having Shared Libraries", both issued to Van Huben et al. as well as the following patent applications:

U.S. patent application Ser. No. 08/772,064 entitled "Data Management System for Concurrent Engineering", filed Dec. 6, 1996, now abandoned.

U.S. patent application Ser. No. 08/761,474 entitled "Data Management System for Problems, Releases and Parts", filed Dec. 6, 1996, U.S. Pat. No. 5,864,875.

U.S. patent application Ser. No. 08/761,253 entitled "Data Management System and Process", filed Dec. 6, 1996, U.S. Pat. No. 5,878,408.

U.S. patent application Ser. No. 08/760,913 entitled "Data Management System for File and Database Management", filed Dec. 6, 1996, U.S. Pat. No. 6,088,693.

U.S. patent application Ser. No. 08/761,463 entitled "Data Management Control System for File and Database", filed Dec. 6, 1996, U.S. Pat. No. 5,920,873.

U.S. patent application Ser. No. 08/762,236 entitled "Data Management System Having Data Management Configuration", filed Dec. 6, 1996, U.S. Pat. No. 5,920,867.

U.S. patent application Ser. No. 08/759,692 entitled "Data Management Control System for CDA Applications", filed Dec. 6, 1996, and U.S. Pat. No. 5,950,201.

U.S. patent application Ser. No. 08/982,724 entitled "Modular, Scalable Data Management System", filed Dec. 2, 1997, U.S. Pat. No. 5,966,707.

All teach various methods employing a modular scalable data management system which is also envisioned as part of the present invention. However, these inventions and applications assume all the data being managed already exists on a traditional computer machine comprising one or more processors, memory and I/O devices for a user to interact with such as a keyboard, mouse, display, microphone, etc. They fall short of demonstrating how the underlying principles can be expanded to include non-traditional computers such as medical diagnostic equipment, industrial robots, hand-held devices, etc. which can be made to interact with said data management system to assimilate data management practices directly into their primary tasks without the need for human intervention.

Another growing problem involving pervasive computing involves the ability to disseminate data from a central server to a plurality of remote computing devices, and maintain synchronized copies of the data at all locations. Lotus Notes (a trademark of Lotus Development Corporation, a subsidiary of International Business Machines Corporation) and the Briefcase (of Microsoft Corporation) application within Microsoft's Windows 95 operating system are examples of application software which seeks to synchronize data between remote and host computers. Lotus Notes incorporates a sophisticated process known as replication to achieve this goal. During replication, the data within a client computer's database is compared against the data on the host server and the computer with the oldest copy is updated with the most recent. Upon completion of replication a complete image of all the data resides on both machines.

If the database undergoing replication is large a disadvantage of this method becomes apparent; an equivalent amount of storage space is required on the client computer, even if the user only intends to access a subset of the data. Notes does permit data to be organized in FOLDERS, which can be selectively included or excluded from replication, but this fails to address the problem when the user needs to access small amounts of data from the majority of the folders. The problem compounds for large data management environments with tens or hundreds of people trying to share data residing in one database. These limitations make it difficult to centralize the management of different types of data as well as inhibit the interaction between several disparate pervasive devices.

Another problem with the aforementioned synchronization methods is the requirement that all clients must be capable of executing a local copy of the synchronization application (such as Lotus Notes). Devices such as a digital camera generate data can be useful in a Lotus Notes environment, but in order to assimilate it into that environment the camera necessitates a link to a personal computer executing a client copy of Lotus Notes. This not only requires a hardware platform with significant resources (i.e. Pentium-class PC, 32 MB RAM, minimum 200 MB Hard Disk), but it must be a true "computer" (PC, Workstation, Server, Laptop, etc.) running a full size operating system (Windows NT, Windows 95, OS/2, OS/390, etc.). This virtually alienates small pervasive devices such as cell phones, pagers, PDAs, electronic organizers, etc. Since Notes is capable of managing a multitude of information including e-mail, addresses, telephone numbers, appointments, etc., one can envision how productivity can be improved by enabling a direct exchange of information between pervasive devices and such an application.

Although this example cites Lotus Notes, one skilled in the art can appreciate how this problem grows in complexity when one considers the task of integrating all the various types of pervasive devices with the myriad of computer platforms, operating systems, databases, data management systems, and protocols in existence.

SUMMARY OF THE INVENTION

In accordance with our invention we have provided a method for enabling a central data management system to interact with a pervasive computing device, comprising the steps of providing a common access protocol for enabling any pervasive computing device capable of executing a control program tangibly embodying a program of instructions to interact with a centralized data management system, and providing a commonly accessible data management system which possesses a plurality of data managers for data residing in a data repository managed by a virtual control repository.

Pervasive computing devices in accordance with our invention utilize a common access method which permits the disparate data to be managed by a single virtual Data Management System based on a modular, scalable architecture. The pervasive devises are those found in typical corporate and enterprise environments where elements of the Data Management System may exist on a homogenous computer platform or they may be dispersed among a plurality of platforms in a distributed computing environment. The interaction between these pervasive devices and the Data Management System is accomplished through a plurality of commonly available communication protocols which permit the Data Management System to be particularly useful for business solutions which employ our processes and methods, such as health care, manufacturing, electronic business (e-business or e-commerce are synonymous) and commerce, inventory tracking, distribution and any related field which can benefit from a common repository for managing data from a variety of sources.

Our invention provides a common access method which permits almost any pervasive computing device to interact with a centralized Data Management System (DMS). Data generated, captured, manipulated, or otherwise transmitted by these pervasive computing devices is stored in the DMS using the PFVL PARADIGM as a means of organizing disparate data in a similar and consistent manner. Furthermore, the DMS is implemented using a modular, scalable architecture which permits maximum flexibility ranging from a homogenous DMS whereby all data is managed by a single physical entity all the way to a heterogeneous environment comprised of a plurality of entities. For example, the Control Repository which tracks the actual data objects and their attributes can be realized using relational or object oriented databases, metadata, flat file tables, directory structures, or binary encoded control files. The underlying DMS applications can be implemented using any typical programming or macro language, including but not limited to, C, C++, Java, Basic, Assembler, Perl, Unix Shells, JES, Lotus Script, SQL, REXX, etc. This permits the same methods to be incorporated across disparate repositories and pervasive devices.

The system we employ uses a data management control program tangibly embodying a program of instructions executable by a supporting machine environment for performing method steps by a data management system having a library organization which receives a request initiated from one or more pervasive computing devices such as, but not limited to, health care equipment (CT-Scanners, Magnetic Resonance Images, cardiac monitors, laboratory test results, etc.), industrial robots, bar code scanners, digital cameras, palm top computers, laptop computers, pagers, electronic organizers, audio dictation and recording equipment, and musical equipment. These devices, or any other pervasive devices employing a programmable machine such as an embedded controller, microprocessor or digital signal processor, locally execute a DMS application which gathers the required data and transmits it to the centralized Data Management System using a variety of communication protocols such as TCP/IP, token ring, ethernet, Bisync, RS-232, HTTP, DCE, wireless, infrared, optical, or any protocol capable of establishing a connection between a multitude of computing machines and transferring digital data streams.

The data management system described herein has a plurality of data managers and is provided with a plurality of data managers in one or more layers of a layered architecture. The system performs with a data manager and with a user input via an API a plurality of processes on data residing in homogenous or heterogeneous data repositories of said computer system including promotion, check-in, check-out, locking, library searching, setting and viewing process results, tracking aggregations, and managing parts, releases and problem fix data under management control of a virtual control repository having one or more physical heterogeneous repositories. The system provides for storing, accessing, tracking data residing in said one or more data repositories managed by the virtual control repository.

Our invention further provides a means for data generated or captured by pervasive devices to be stored temporarily or permanently on said devices, and whereby these devices can become extensions of the central repository. For example, images from a CT-Scan can be stored in a locally attached disk file and organized by PFVL. This permits the Control Repository, which may be a DB/2 relational database running on a server, to access and manage this data. This is accomplished without the need for the pervasive device to run a copy of DB/2 or even be aware that the Control Repository is implemented with DB/2. If the Control Repository changes to another implementation, such as an Oracle database, the DMS applications within the pervasive devices require no alteration.

Additionally the present invention demonstrates several improvements in the area of data access, sharing and synchronization among multiple disparate pervasive or traditional computing devices. These methods can be used to facilitate e-business, increase remote computing efficiency, and automate many data management tasks traditionally performed via manual data entry or omitted entirely. Our invention further demonstrates how the concepts conveyed in the disclosure can be applied to virtually any data repository including groupware such as Lotus Notes. The underlying Control Repository tables can be implemented using databases, document, and even spreadsheets.

These and other improvements are set forth in the following detailed description. For a better understanding of the invention with advantages and features, refer to the description and to the drawings.

BRIEF DESCRIPTION OF THE DRAWINGS.

FIG. 3B shows how the PFVL PARADIGM can be adapted to multiple real life applications.

FIGS. 4A and 4B depict a complex Data Repository illustrating various means in which data can physically reside in the Data Management System.

FIG. 8 shows an example of how a DMS function is invoked with the standard API and is transferred through the architecture to the Control Repository Access layer.

FIG. 9 shows examples of Control Repository Access transactions

FIGS. 11A & 11B illustrates the present invention by way of an example manufacturing environment.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

Our detailed description explains the preferred embodiments of our invention, together with advantages and features, by way of example with reference to the aforementioned drawings.

DETAILED DESCRIPTION OF THE INVENTION

The present invention employs the use of a modular, scalable Data Management System (DMS) combined with a universally applicable organizational paradigm which enables a plurality of disparate pervasive computing devices to interact with said Data Management System using uniform access methods. Both the access methods and the underlying DMS can be implemented using various means, and although our invention is illustrated using specific embodiments, it should be noted that the invention is by no means limited to the scope of these scenarios.

Figure 1:
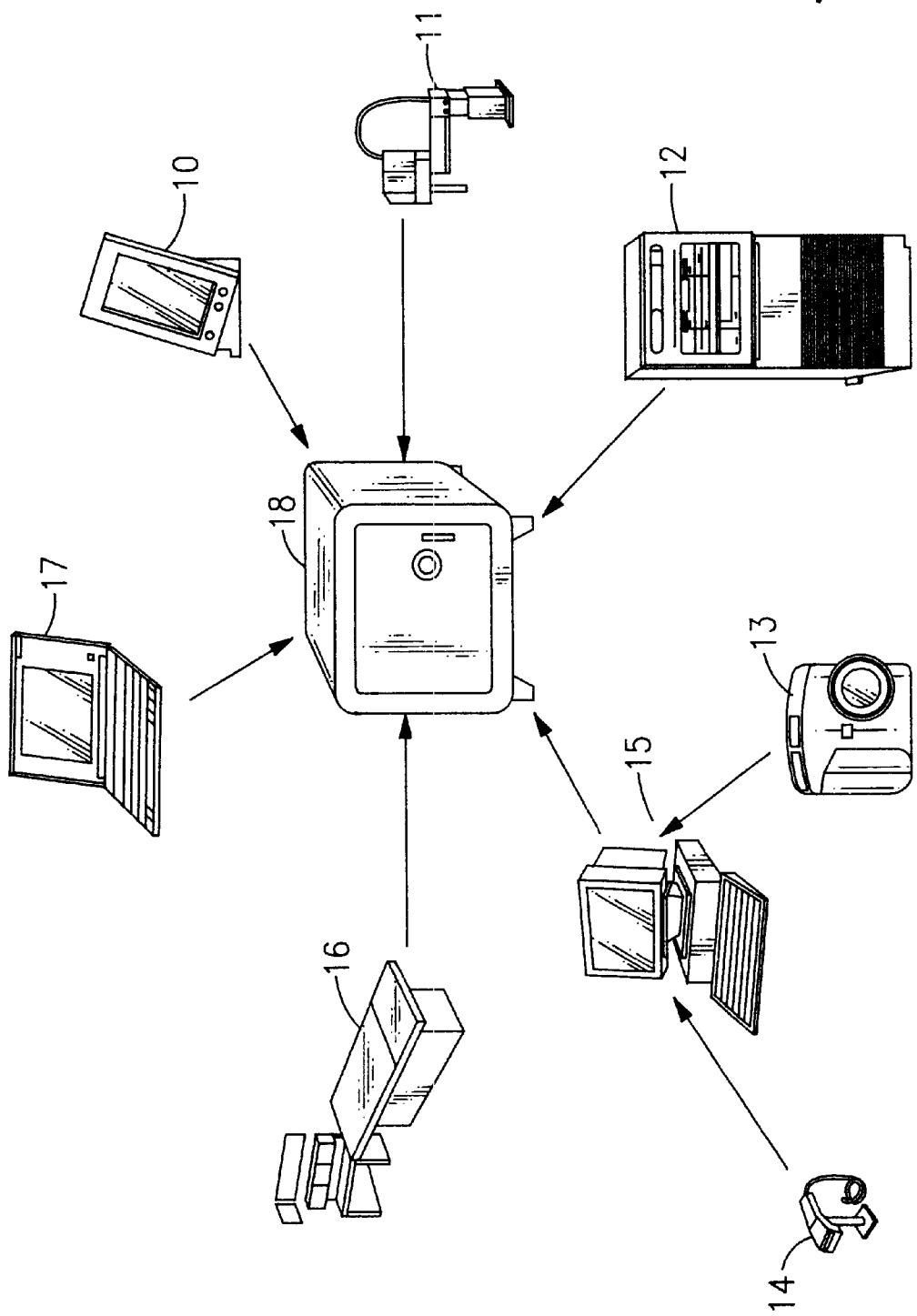
FIG. 1 shows an overview of the preferred embodiment illustrating a plurality of disparate pervasive computing devices interacting with a centralized Data Management System.

FIG. 1 depicts the overall architecture of the invention whereby a multitude of pervasive computing devices (10) such as palmtop computers, pagers, electronic organizers, industrial robots (11), servers (12), workstations, terminals, peripheral devices such as digital cameras (13), bar code scanners (14), personal computers (15), medical diagnostic and imaging equipment (16) and portable computers (17) such as notebook and laptop computers interact with a Central Repository (18). Our invention conveys a common access method that can easily be implemented in these devices and apparatus as long as they support any type of communication protocol capable of transferring data streams to the Central Repository (18) either via direct connection or indirectly such as using uploading the data to a personal computer, and then establishing a connection from said personal computer to the Central Repository (18).

Our invention contemplates several means of implementation for the Central Repository (18). The preferred embodiment will demonstrate how the underlying Data Management System can be comprised of relational databases, object oriented databases, file systems, metadata, file formatted tables or any other means which enables data to be organized and accessed. Additionally the Central Repository (18) can physically reside across a plurality of disparate systems including, but not limited to, servers, mainframes, workstations, personal computers, portable computers or any other device that constitutes a machine environment capable of executing a program of instructions.

The pervasive computing and peripheral devices (10 through 17) shown in FIG. 1 establish communication links either directly or indirectly to the Central Repository using any applicable communication protocol such as, but not limited to, TCP/IP, RS-232, Bisync, wireless, infrared, etc. which can be used to transmit transactions based on an access method that permits each device to interact with the repository in a common fashion regardless of the communication protocol used or the repository implementation.

In order to further understand the preferred embodiment, we find it beneficial to describe the underlying architectural principles disclosed in U.S. patent application Ser. No. 08/982,724 entitled Modular, Scalable, Data Management System. The present invention contemplates the use of said Modular, Scalable DMS employing a novel, layered architecture which permits the DMS to be constructed and maintained in a modular fashion. Additionally, this approach also allows the DMS to be easily scaled from a low-end client-only system to a large, high-end globally distributed enterprise wide data management system. In accordance with our preferred embodiment a Data Management System has a plurality of data managers and is provided with a plurality of data managers in one or more layers of a layered architecture. The system performs with a data manager and with a user input via an API a plurality of process on data residing in heterogeneous data repositories of said computer system including promotion, check-in, check-out, locking, library searching, setting and viewing process results, tracking aggregations, and managing parts, releases and problem fix data under management control of a virtual control repository having one or more physical heterogeneous repositories. The system provides for storing, accessing, tracking data residing in said one or more data repositories managed by the virtual control repository. User Interfaces provide a combination of command line, scripts, GUI, Menu, WebBrowser maps of the user's view to a PFVL paradigm. Configurable Managers include a query control repository for existence of peer managers and provide logic switches to dynamically interact with peers. A control repository layer provides a common process interface across all managers data view maps to a relational table paradigm and maps control repository layer (CRL) calls to sequences of SQL queries. A command translator for a relations data base provides pass through of SQL queries. Table files map SQL Queries into a set of FILE I/O's with appropriate inter I/O processing, and meta data maps SQL Queries into Meta data API calls with appropriate inter I/O processing. DMS functions and utilities include an API, and a a complete set of functions based on a PFVL paradigm. PFVL paradigm calls are mapped into DataManager(s)/Control Repository calls. The client/server interface is a common interface to a enterprise Client/Server network, and may be reduced in size for acting for a co-resident client/server. The data repository is an aggregation of disparate data storage engines. A package manager tailors the control repository and provides methodology customization with package, variance, filetype, level granularity.

Generally, by reviewing this invention, as well as the prior application it will be appreciated that we provide as described herein a modular, scalable Data Management System which uses a single paradigm to manage similar or disparate data objects in a local or distributed client/server environment. The modular implementation method disclosed herein affords the opportunity to install, implement or configure new elements to the system as the demand changes. Furthermore, the scalable nature of our system and methods permits the same DMS to grow from a simple, low-end client-only environment to a high-end fully secure client-server implementation. The improvements which we have made demonstrate how a single data management architecture can be used to adapt to virtually any methodology or process. Our processes thus provide a framework for accommodating a plurality of physical storage repositories in addition to a centralized Control Repository which can be implemented using various means.

Generally we proceed by employing a layered architecture centered around a plurality of MANAGERS conforming to a common data classification method known as the PFVL PARADIGM. This flexible paradigm allows data related to hardware design, software development, inventory control, manufacturing or any other field requiring shared data management to be tracked using the same Data Management System. All objects are tracked with a centralized Control Repository and stored in a shared Data Repository.

We use our Managers and architectural layers as a framework for a plurality of applications, functions and transactions implemented in a modular fashion. Smaller transactions and functions can be combined to form larger more complex functions or data management applications. This layered implementation promotes the concept of functions and transactions which can be instantiated in a plurality of applications. The layers also permit applications to be written without explicit knowledge of the physical implementation of the Data Management System.

Adaptation of the DMS to a user environment is accomplished through a single architectural layer. This allows the architectural core, including all the transactions and functions encompassed therein to remain methodology and environmentally independent.

Our DMS allows applications to remain methodology independent through the use of a standardized application program interface. User interfaces can be constructed to customize the same DMS application several different ways to conform to user methodologies. Conversely, our invention teaches an alternative method for implementing applications using easily customizable state tables.

Our Client/Server Interface allows the elements of the DMS to interact locally in a client-only environment or via a client/server connection. The client/server implementation can be achieved in a Local Area Network, Wide Area Network or a globally distributed environment such as the internet.

Scalability of the DMS is achieved through the use of configurable Managers which can be switched on or off depending on the needs of the users. Since all the Managers conform to the PFVL Paradigm and follow a standardized application program interface, new Managers can be added to the system without the need to reconstruct or alter the existing DMS.

The physical implementation of the DMS is described in two sections which deal with the Data and Control Repositories separately. The Data Repository may be implemented using a plurality of means ranging from simple file systems to commercially available Product Data Management (PDM) systems such as RCS, Sherpa, MetaPhase, etc. The data can be physically located in a single storage medium such as a hard disk, local file system, or server, or distributed throughout a plethora of storage media scattered geographically. The centralized Control Repository can be implemented using several approaches, including but not limited to, relational or object oriented databases, flat files, meta data files or table formatted files. This disclosure describes the use of Command Translators which map generic Control Repository transactions to the appropriate access method corresponding to the physical implementation. This approach permits the information in the Control Repository to be migrated between different physical implementations. It even allows multiple physical implementations to act as a single logical Control Repository.

We will describe in the following detailed our new processes and methods with respect to the overall architecture with advantages and features next with reference to the drawings.

OVERALL ARCHITECTURE

Figure 2:
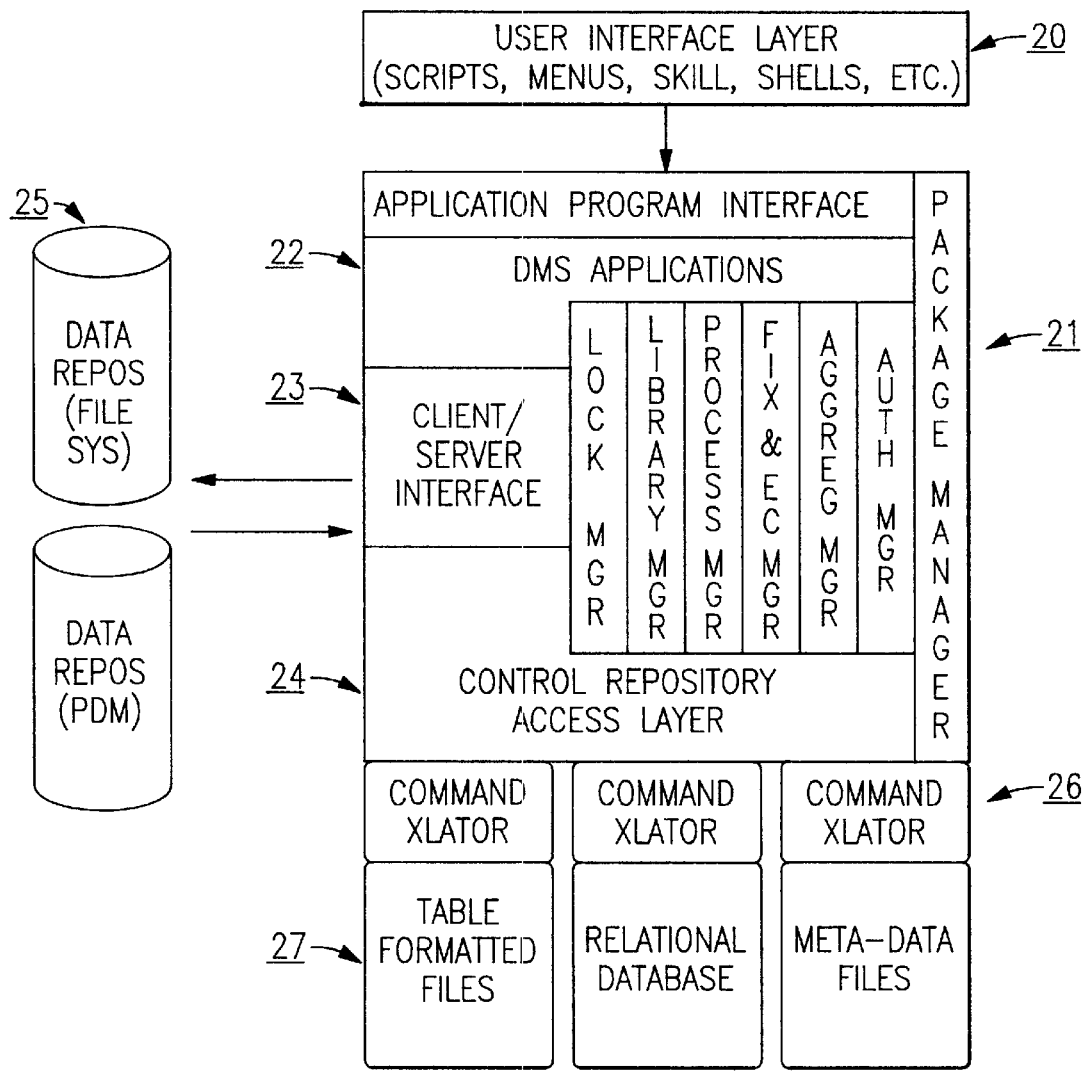
FIG. 2 shows an overview of the preferred embodiment through the use of an architectural block diagram.

FIG. 2 depicts the overall architecture of the preferred embodiment. The entire DMS architecture is based on the PFVL paradigm, illustrated in FIG. 3, which allows the DMS to be environment and methodology independent. All interfaces into the DMS use a standard PFVL based API which provides the flexibility to use a common DMS across several similar or disparate user groups. For example, this system could be used to manage the data for both the electrical and mechanical components in an automobile company.

Figure 3A:
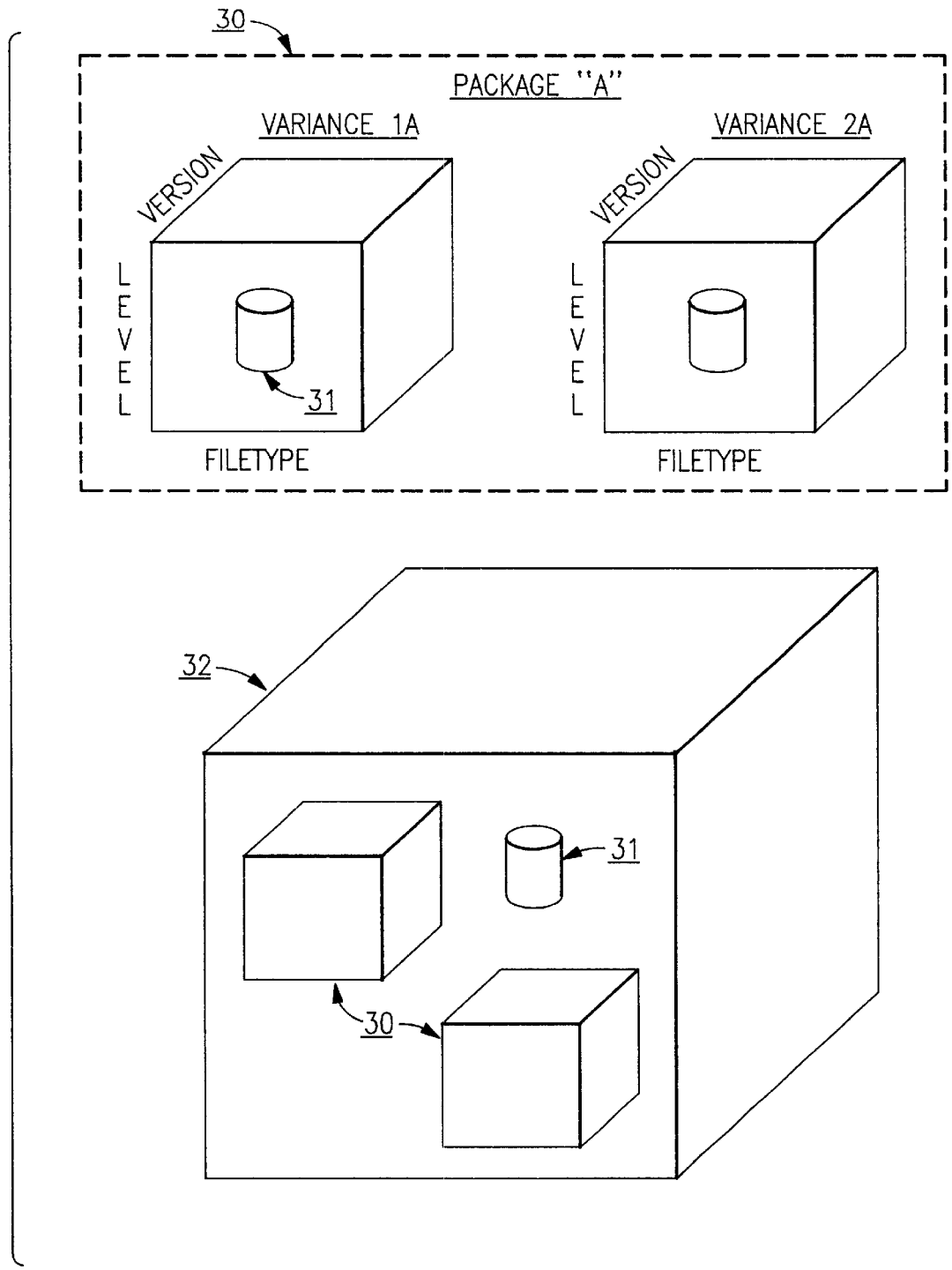
FIG. 3A shows a symbolic representation of the PFVL PARADIGM for both a single Package and a grouping of hierarchical Packages.

In order to understand many of the underlying architectural concepts conveyed in this disclosure, we turn our attention to the PFVL diagram depicted in FIG. 3. FIG. 3A illustrates the PFVL PARADIGM through the use of a multidimensional symbol such as a cube. The present invention teaches the notion that all objects resides in a Data Management System can be classified according to five basic attributes:

PACKAGE An arbitrary grouping of data objects that has some relationship. or common bond with each other. Each package contains one or more variances.

VARIANCE One or more objects within a package that, when combined with the remaining objects in the same Variance or from one or more dependent Variances, comprise a coherent and meaningful collection of objects.

LEVEL A collection of objects, within a Variance, that have achieved some arbitrary degree of quality.

FILETYPE A collection of objects sharing the same data type or format.

VERSION An iteration of a data object

As an example, FIG. 3A depicts PACKAGE "A" (30) comprised of two Variances. Within each VARIANCE are one or more data objects (31) of a given FILETYPE, residing at one or more LEVELS, with one or more VERSIONS of the object. In the simplest case, a single Version of a single Filetype exists at a single Level within a single Variance of a single Package. Our invention achieves tremendous flexibility by allowing any of these attributes to be expanded N ways. By varying the dimensions of the cube, and the number of cubes in the Package, one can create a DMS capable of managing data in almost any environment.

The present invention also permits Packages to be arranged hierarchically. This is illustrated at the bottom of FIG. 3A where Package "A" (30) is embedded within a higher level Package (32). The higher level Package may also contain its own data objects (31) as shown in the figure. This is possible because each Package in the hierarchy has its own set of PFVL attributes. For example, a printed circuit board could be considered a high level Package comprised of various ASICs, resistors, capacitors and connectors. The ASICs on the board could be considered Packages themselves, where each ASIC Package is comprised of the underlying circuit designs.

FIG. 3B contemplates two examples of how the PFVL Paradigm can be implemented in actual applications. The first table (33) demonstrates a typical electrical engineering design environment comprised of design objects dispersed in the DMS. The primary design object is an MPEG design consisting of multiple versions of a schematic residing in the "dsgn_lib" design library. This library also contains a VHDL object for the MPEG design. It can also be seen that the dsgn_lib library contains two Levels, Test and Prod. Versions of the MPEG schematic simultaneously exist at both Levels. Most of the objects are classified under the Universal Serial Bus (USB) Variance, except for a PCI Variant of the MPEG schematic. Our invention allows Variances to be completely independent or dependent upon other Variances. In this example, if the PCI Variance is based on the USB Variance, then all objects in the USB Variance can be picked up and used in the PCI Variance, unless they need to be modified. DMS Table 23 also illustrates an additional object, the Bus Controller, which also resides in the PCI Variance of the dsgn_lib library. Finally, the diagram illustrates an MPEG Layout which resides in a separate Package known as the Circuits library.

The second DMS Table (34) in FIG. 3B shows how the same PFVL paradigm can be used to track objects and subassemblies in an automotive environment. In this case, Packages are used to denote the Cooling and Engine subassemblies as well as the Electro-Mechanical main assembly. Within each sub-assembly are one or more components described in the form of schematics, layouts and VHDL, and residing at quality levels QA1, and QA2. Also, some components exist under distinct Variances in order to accommodate two different automobile models.

Returning to the overall architectural diagram identified as FIG. 2, the top layer is the USER INTERFACE LAYER (20). This layer makes possible such scenarios as sharing electrical and mechanical design information by acting as an environmental adapter. An example of such an adaptation is present in a large electronic design organization where several design groups need to share data among several libraries. A common DMS application in this scenario would be a Check-In operation which allows data to enter the DMS from a user's private work space. Since the DMS accommodates several design groups using numerous libraries, the DMS Check-In application's API requires one of the invocation parameters to be the PACKAGE. If the methodology requires all the designers on a team to check their data into a single library, the User Interface Layer may employ a local "wrapper" or user utility which only requires the user to enter the name and type of design object being checked in. This wrapper then passes this information to the DMS Check-In application. It also supplies the sole library name as the PACKAGE as well as a hard-coded LEVEL and VARIANCE.

To further demonstrate the advantage of the User Interface Layer, consider a second design group which also uses the same DMS to manage their data. Unlike the first design team, this one designs subassemblies in which each subassembly is treated as a PACKAGE. Since this team requires access to multiple packages, their Check-In function may consist of a "wrapper" in the User Interface Layer which invokes a menu that permits the user to specify a Sub-Assembly name. The wrapper then calls the same DMS Check-In application used by the aforementioned design group. However, this wrapper passes the Sub-Assembly name as the PACKAGE rather than hard-coding it like the first wrapper.

One skilled in the art could easily envision how the User Interface Layer can employ several methods such as, but not restricted to, wrappers, shell scripts, batch files, command line interfaces, graphical user interfaces, web browsers, menus, or voice activated systems, which would be customized to the user's environment or methodology. The advantage to this approach is it allows different methodologies or processes to utilize the same underlying Data Management System. In addition, if an existing methodology changes, the underlying DMS functions remain intact. Only the functions in the User Interface Layer need to be modified to accommodate the new methodology.

Returning to FIG. 2, our preferred embodiment contemplates the use of several layers which comprise the core architecture of the DMS. Spanning three of the layers are the DMS MANAGERS (21). These are comprised of a plurality of functions, some of which belong to the DMS Application, Client/Server and Control Repository Access layers. By grouping these functions into isolated Managers with standardized interfaces, a great deal of modularity is achieved. Furthermore, these functions can be combined to form larger, more complex, applications. Consider the following portion of an example promotion application which illustrates one way to deploy a modular DMS:

```
if (Lock_Manager_Installed) {
    query Control Repository for any locks that exist on the
        file
    if (locks_exist) fail the promote
}
if (Authority_Manager_Installed) {
    query Control Repository to see if user has authority to
        do the promote
    if (user_not_authorized) fail the promote.
}
if (Process_Manager_Installed) {
    query Control Repository to see if any Library Processes need to run
    if (library_processes_exist) invoke them and wait for
        completion
}
Check Promotion Criteria
Tell Control Repository to update level of the file
Perform necessary update to data repository (move file,
    update link, etc.)
```

Within each code branch one or more Manager functions are invoked to perform the necessary DMS operations. By combining these functions together in an algorithmic way, one can achieve highly complex DMS applications. Furthermore, one can see how modularity can be achieved using the IF statements to test the Control Repository for existence of a particular Manager. This permits Managers to be installed or configured in a "plug-n-play" manner simply by setting switches in the Control Repository.

One could also envision an alternate embodiment where all the functions within each manager are compiled into independent objects. A DMS vendor or supplier could then construct customized DM systems based on the customer's needs, simply by linking together the required modules. For example, customer A may only require basic data management services so the DMS provider would only link the object code from the Library, Package and Lock Managers into a "lite" version of the DMS. Customer B, on the other hand, may require use of applications involving aggregations (configurations) and Library Processing. This customer's DMS would link the object code from the Library, Package, Lock, Aggregation and Process Managers. Regardless of the implementation method, one skilled in the art can clearly envision the advantages afforded by such a system since enhancements or changes to functions in one Manager don't require the entire DMS to be recompiled, or redistributed.

FIG. 2 also depicts the DMS APPLICATIONS layer (22) which contains all the standard utilities that a user needs in order to interact with the DMS. This includes things like Check-In, Check-Out, Promotion, Locking, Library Searching, creating and tracking an aggregation or configuration, and setting or viewing process results. These utilities are described further is this disclosure as either functions residing within a particular Manager, or applications which consist of one or more functions, confined to a single Manager or involving a plurality of Managers. All functions and applications within this layer follow a consistent, standardized Application Program Interface which allows them to remain isolated from any user environment or methodology. This feature of the invention allows a single DMS to be deployed through several user groups performing similar or disparate work, yet having the need to share data between them.

In the preferred embodiment, all functions and applications communicate with the Control and Data Repositories through the CLIENT/SERVER INTERFACE (23) layer. This is an expandable or contractible layer designed to allow either communication between the various layers in a client-only environment or between clients and one or more servers existing anywhere in a global enterprise. The same set of Manager functions, DMS applications and Control Repository Access routines are utilized regardless of the client/server topology.

All communication into the Client/Server interface layer is directed to either the CONTROL REPOSITORY ACCESS LAYER (24) or the DATA REPOSITORY (25). The Control Repository Access Layer consists of one or more "transactions" which perform simple or complex operations against the Control Repository (CR) itself. These can typically be categorized as adding information to the CR, modifying existing information in the CR, deleting information from the CR, or extracting (and potentially filtering) information out of the CR. Regardless of the type of operation, all transactions in this layer are written as if the Control Repository is a single virtual repository consisting of tables organized around the PFVL paradigm. This approach allows different physical implementations of the Control Repository. It even permits a plurality of physically different implementations to appear as a single virtual Control Repository.

Our invention further contemplates a virtual DATA REPOSITORY (25) comprised of one or more physical repositories. The underlying repositories can be a simple file management system such as the Distributed File System (DFS) or a simple directory structure organized on a hard or floppy disk. Correspondingly, the data repository could be constructed using proprietary or commercially available storage engines or PDM products such as RCS, Sherpa, MetaPhase, SCCS, CMVC, and ClearCase. Furthermore, the present invention permits Automated Library Machines to be employed as Data Repositories. As shown in FIG. 2, all communication with the Data Repository is performed through the Client/Server Interface layer, which permits the Data Repository to be locally accessible to the client, or distributed anywhere in the global enterprise on a remotely accessible server.

Figure 4A:
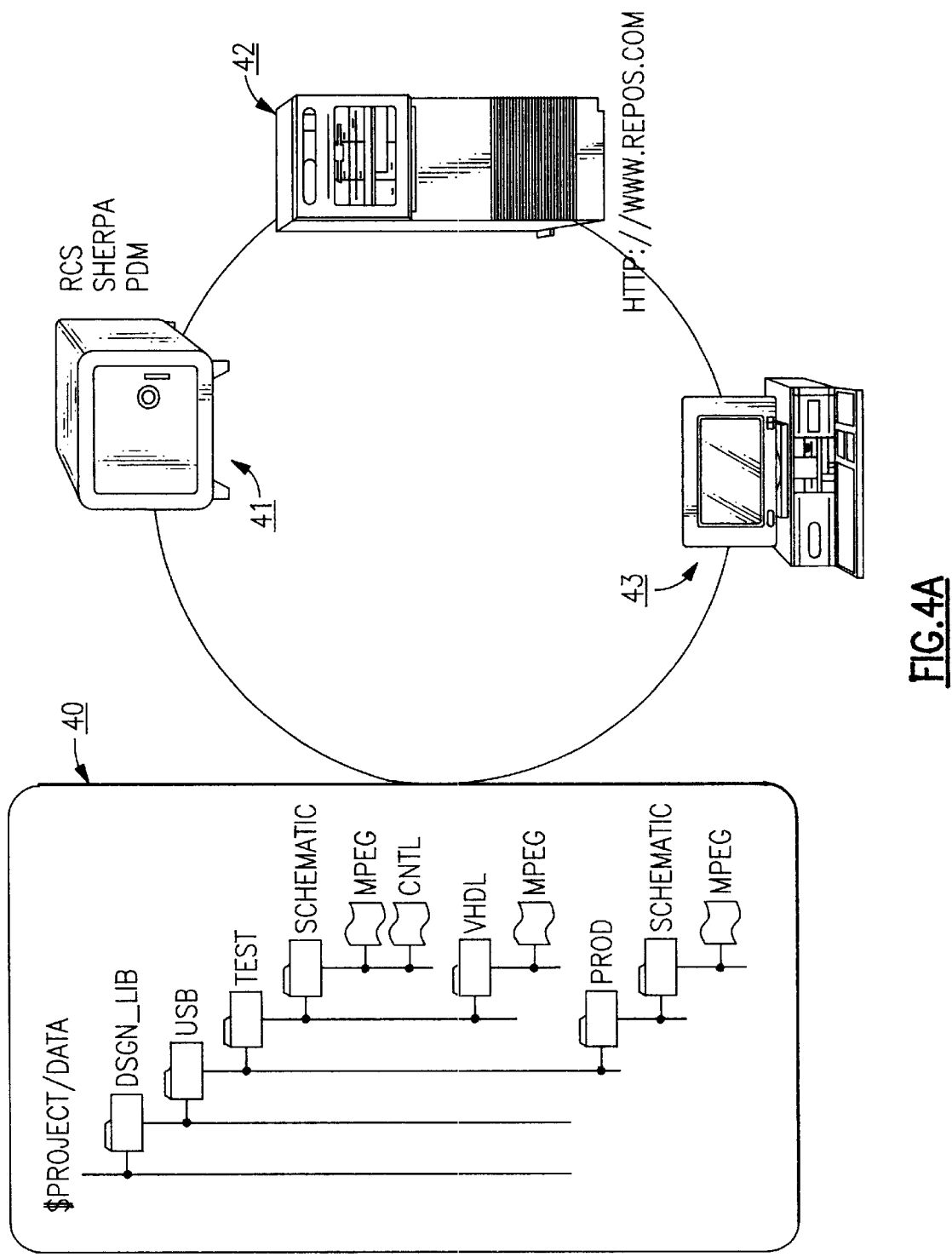

FIG. 4 depicts a complex Data Repository comprised of Data Repository A (40) which is a simple UNIX directory where the files in the DMS may reside. Additional data may be stored in Data Repository B (41) which is a commercially available PDM such as RCS or Sherpa. Although these storage engines automatically handle revision control whenever a user checks data into or out of the system, the preferred embodiment maintains it's own unique file identifier in the form of a File Reference number within the Control Repository. The main reason for this is that it allows all data in the DMS to be tracked in a similar fashion regardless of the physical storage method employed. Furthermore, if the data ever needs to be transplanted from one storage engine to a completely different one, the operation can be accomplished by checking the data out of the old storage engine, checking it into the new one, and updating the associated Control Repository table which maps the File Reference number into a revision number. Since all information associated with the object is tracked by PFVL and File Reference number, the information is kept completely in tact even if the old and new storage engines use completely different revision control methods. Returning to FIG. 4, Data Repository C (42) could be a physical location on a server accessible via a Universal Resource Locator (URL) on the World Wide Web (WWW). Although all data in this system is stored using a variety of means, the PFVL Paradigm serves as the common storage model such that any client (43) can interact with the data. Furthermore, data is directed to the appropriate Data Repository through the use of the Data Repository Table (44). It clearly illustrates how the PFVL attributes can be used in any combination to segregate the data into one or more physical repositories. For example, all VHDL in the MPEG design library will be stored in Repository B which represents one of the commercial revision control engines such as RCS or Sherpa. Wiring Layouts for the Rel_1 Level of the Base Variant of the MPEG design library are stored in a DFS directory represented by Repository A, and customer documentation for the MPEG design is stored in a publicly accessible URL represented by Repository C.

One skilled in the art will also note that the use of wild cards in conjunction with the PFVL attributes permits a great deal of granularity in storage partitioning. The example shows a wild card (*) in the Filename field, but this could also be filled in with a specific file or a family of files matching a certain pattern. Additional fields could also be added to the table such as a Version field to allow data to be physically segregated by version or File Reference numbers, or number patterns. This approach offers the advantage of being able to not only use different storage methods for different types of data, but also solves problems associated with large, incompressible, files filling up physical storage media. This problem is prevalent in many commercial available data management systems which require either entire libraries or entire releases of data to be physically stored using the same means under a common directory structure.

Returning to FIG. 2, the bottom of the diagram shows the CONTROL REPOSITORY (27) which can be implemented using a multitude of methods, including, but not limited to, Table Formatted Files, Relational or Object Oriented Databases, Lotus Notes databases, spreadsheets, or Meta-Data files in any format. Our invention also permits one or more of the above implementations to be used simultaneously to comprise a single virtual Control Repository. Regardless of the physical implementation of the Control Repository, all information is organized under the PFVL paradigm such that any entry in the repository directly or indirectly maps to one or more PFVLs. This permits users to access information about any object residing in any Package or library, at any Level or Variance regardless of whether that piece of information exists in a relational database, a simple ASCII file or a binary encoded MctaData file. Information can be freely reorganized or transplanted between different Control Repository implementations without the need to modify any DMS Applications, Manager functions or Control Repository Access transactions. Tables support underlying Manager functions and DMS Applications.

A key player in enabling the aforementioned feature are the COMMAND TRANSLATORS (26) which interface between the CONTROL REPOSITORY ACCESS LAYER and the CONTROL REPOSITORY (27). Each physical implementation of the Control Repository would employ a unique Command Translator to map the generic Control Repository Access transaction into the appropriate command to satisfy the physical repository. For example, a relational database may be able to accept the Control Repository Access transaction "as is" or with a simple syntax modification while a binary encoded MetaData file would require a function capable of parsing and manipulating the MetaData file.

In a similar manner to the Data Repository, this approach also enables a great deal of flexibility in upgrading the Control Repositories or permitting data from disparate sources to appear as one logical repository. For example, a SQL database may be employed as the primary Control Repository which includes all information necessary to track each object in the DMS by File Reference, PFVL, physical location, etc. This repository may also contain a Part Number table for all the manufactured pieces of a product. Off to the side might exist a Lotus Notes database containing service call or defect repair information organized by Part Number for the same product. Our invention would allow Control Repository Access transactions to be written, using an identical SQL-like syntax, to extract design information about the part from the SQL database and repair actions from the Lotus Note database. This way someone with no knowledge of the underlying Control Repository structure could write a DMS Application to invoke said functions and create a customized report containing information from both databases. The Command Translators would be responsible for mapping the generic transaction for the design information into a true SQL command, and mapping the repair action transaction into a Notes transaction.

DMS APPLICATION LAYER

Our invention contemplates an architectural layer dedicated to the various DMS Functions and Utilities that a user invokes to manipulate the Data Management System. Common functions found in this layer include, but aren't limited to, Check-In, Check-Out, Promote, Setting Locks, Checking Authorities, etc. Furthermore, these functions share a consistent application program interface (API) following the PFVL paradigm, which allows this layer to remain methodology and environment independent.

Figure 5:
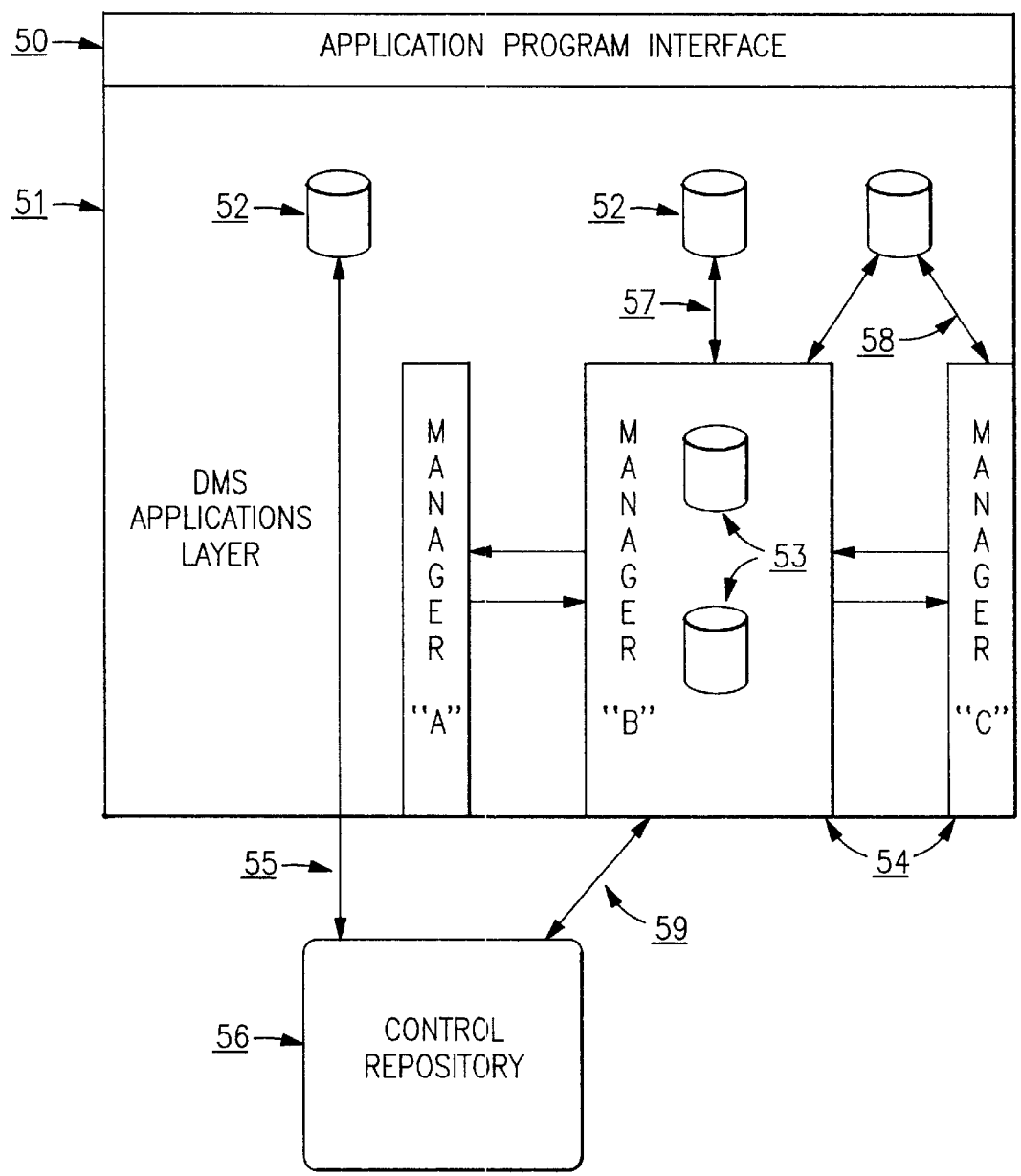
FIG. 5 shows a detailed diagram of the DMS Application Layer introduced in FIG. 2.

FIG. 5 conveys the preferred embodiment of this layer. The DMS Applications Layer (51) is comprised of all the applications that enable a user to interact directly with the DMS. Each application consists of one or more application modules (52) which may or may not interact with the various Managers (54). FIG. 5 depicts various scenarios involving the interaction with the application modules:

NON-MANAGER INTERACTION (55) An application may desire to interface directly to the Control Repository (56) without the need to interact with any Managers. An example might be a function which extracts project management data from the Control Repository and displays it in a formatted report.

SINGLE MANAGER INTERACTION (57) An application may only need to interface with a single Manager in order to execute all the steps in the application's algorithm. For example, an application which associates an object to a problem fix number only requires functions within the Problem Fix/EC/PN Manager.

MULTIPLE MANAGER INTERACTION (58) Often application algorithms require interaction with a plurality of Managers. For instance, a promotion algorithm may interface with the Authority Manager to determine if the user has the proper promote authorization. Next, it may execute Process Manager functions to determine if the object meets the necessary promotion criteria. Finally, it may interface with the Library Manager to perform the actual promotion to the next level.

CONTROL REPOSITORY COUPLED WITH MANAGER INTERACTION (59) Any combination of the above methods may be used to construct an application which interacts with one or more Managers in addition to the Control Repository. For instance, an application may query the Control Repository to see which Managers are currently installed in a user environment, and use that information to branch through various parts of the algorithm which interface with the Managers.

Within each Manager, FIG. 5 depicts one or more Manager Functions (53) which combine to form a library of utilities upon which applications can be constructed. For example, the Problem Fix/EC/PN Manager contains:

Functions to associate objects to Problem numbers

Functions to associate Problem numbers to releases

Functions to associate Part Numbers to objects

Together these modules form a library of functions within each Manager, upon which application developers can create more complex utilities.

FIG. 5 also depicts an Application Program Interface (50) common to all applications and functions in the DMS Application Layer. The API is based on the PFVL paradigm. By requiring all the functions to conform to the PFVL paradigm they remain methodology independent while retaining the flexibility to be adapted to any user environment through the use of the User Interface Layer. Our preferred embodiment requires all functions in this layer to be invoked by passing PACKAGE, FILE TYPE, VARIANCE, and LEVEL as the minimum amount of information. Additional information such as filename, iteration, or run-time options may also be supplied. Our embodiment also permits the wild card character (*) to be used on any combination of PFVL attributes. For instance, if a wild card is passed in place of the LEVEL, then all information matching the remaining PFVL attributes at all levels is accessible. The wild card can be combined with a partial PFVL attribute in a similar manner. In this case, a level attribute of PROD* would access all information matching the remaining PFVLs at any level beginning with PROD. Finally, a placeholder such as the percent (%) character can be used to ignore any attribute. Certain DMS applications may not require information regarding all the PFVL attributes, so use of the % character allows every DMS application to use an identical API to facilitate interaction with the user environment. For example, the following API could be used to interface with all DMS applications regardless of their underlying function:

DMS_App_Name<filename><filetype><package><variance><level><options>

If a user environment doesn't necessitate the use of all the PFVL attributes, the user interface layer can suppress or hard-code them prior to invoking the underlying DMS application. For example, a user environment may exist such that variances aren't applicable and data only resides in two levels of a single package (library). Furthermore, the current process only permits users to check data into the DMS at the lowest level. The corresponding user interface may be a simple menu where the only two fields the user enters are the file name and file type. The underlying user interface code would automatically pass the sole package and level, and hard-code or suppress the variance to the DMS check-in API. The advantage to the present invention is in the event the process changes to allow users to perform additional actions, such as checking data into the second level, only the user interface needs to be updated. Neither the underlying DMS applications nor the information in the Control Repository need to be updated.

CLIENT/SERVER INTERFACE

The present invention contemplates the use of a CLIENT/SERVER INTERFACE embedded between the DMS Application and Control Repository Access layers. All communication between the DMS applications and the Control Repository functions is performed through special interface routines. These routines are responsible for locating the proper Control Repository, making the connection, and passing the appropriate information to the underlying Control Repository Access function. This feature allows a completely scalable DMS ranging from a low-end DMS where the Control Repository is directly accessible from the user's client to a high-end enterprise DMS where the Control Repository can be literally spread across a plurality of worldwide servers. For the low-end implementation, the client/server routines simply pass the required information from the DMS application to the CR Access function, much like a parent module invoking an external function or subroutine. In the high-end scenario, the routine would locate the server where the appropriate CR resides, make the appropriate connection and pass the information to the CR function.

In addition to controlling the interface between the DMS applications and Control Repository, the client/server interface also controls access to the Data Repository. Once again, a low-end system may exist whereby the data resides in a file system directly updatable by the user's client. For example, during a Check-In process, the client would physically copy the data from the source location to the actual data repository. This could be accomplished by providing write access to the data repository for all users, or writing a client/server routine which utilizes techniques such as Unix SETUID bits to ensure that data can only be written to the repository via the proper DMS applications. In the high-end scenario, the client/server routines could establish a connection with the server where the data repository resides and employ the server to perform the appropriate file operation. This implementation lends itself to a more secure DMS since access to the data repository can be very tightly controlled, and user clients can not directly update the data repository outside of the DMS either intentionally or accidentally.

Figure 7:
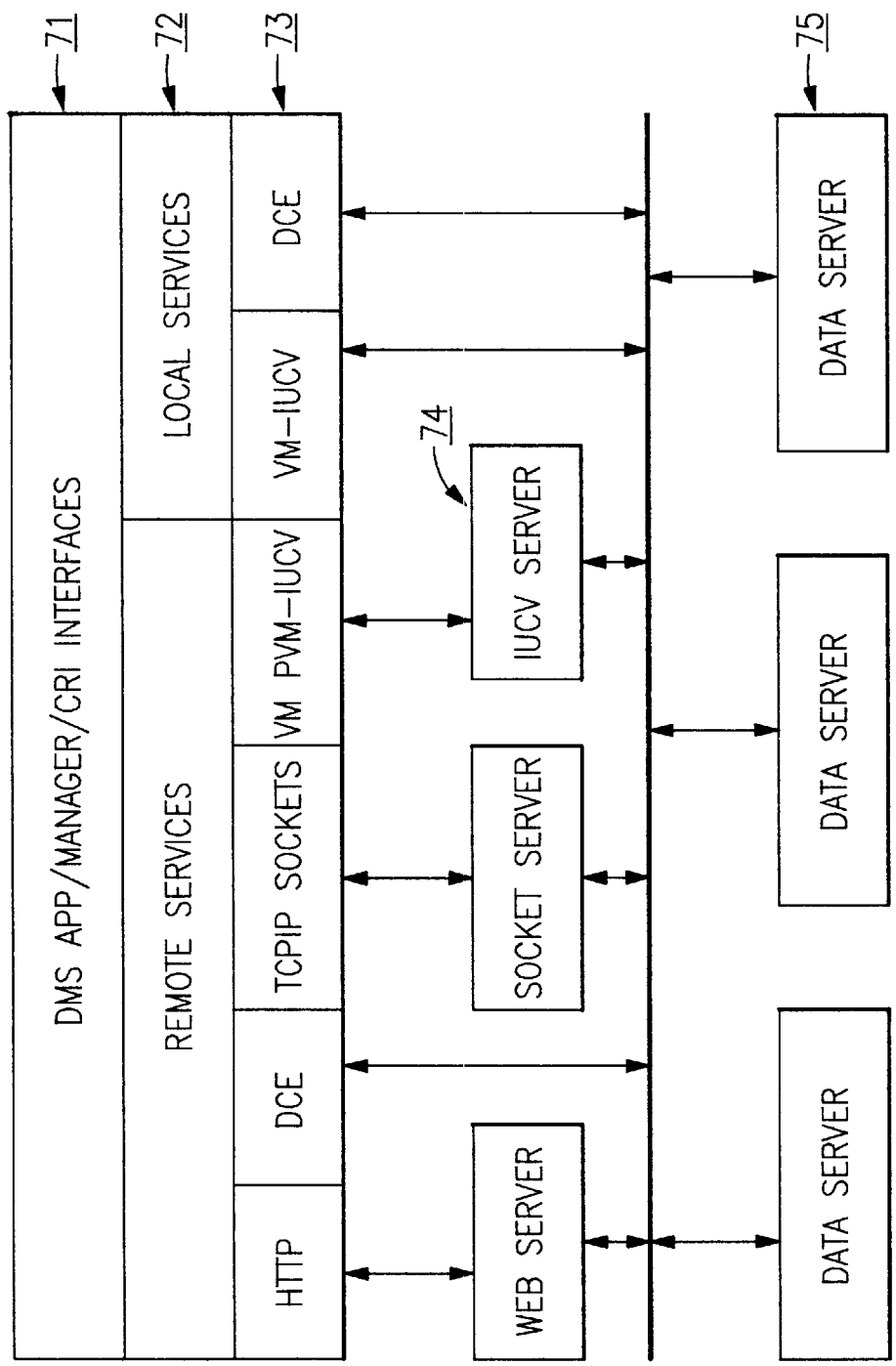
FIG. 7 describes the detailed architecture of the Client/Server Interface layer.

Referring to FIG. 2, the DMS applications(22) and the Various Managers(21) as well as the Control Repository Interface(24) all communicate with the Data Repository(25) and the Control Repository(27) via the Client/Server Interface(23). This interface is depicted in FIG. 7, where the DMS applications, the various Mangers and the CR interface layer is shown (71). Depending on the location of the server, i.e. local or remote, the respective Communications Services(72) are invoked. These services support a variety of protocols including but not limited to those depicted in the (73) layer. Some of these services communicated either directly to the Data Servers(75), through the network and or the severs depicted at the (74)layer.

As an alternate embodiment for this layer, AUTOMATED LIBRARY MACHINES (ALM) are employed in a "batch" environment which permits a large number of DMS operations to be queued and processed by these virtual machines. The Client/Server routines are responsible for creating work requests on the user's client and transmitting them to the appropriate ALM for processing. Use of ALMs also provides the advantage of breaking up large complex DMS applications into foreground and background pieces. The foreground portion runs on the user's client, then a work request is created and transmitted to the ALM through the Client/Server Interface. Upon receipt of the work request, the ALM processes the background portion of the DMS operation, including all file manipulations. Since the foreground portion tends to comprise a series of checks as opposed to intensive computing, improved client throughput can be achieved by offloading the more compute intensive portions of the DMS application to the ALM.

CONTROL REPOSITORY ACCESS LAYER

Our invention contemplates the use of a separate Control Repository Access Layer comprised of a library of functions or TRANSACTIONS which extract, add, modify or delete information from the Control Repository. There are two main advantages to separating this code from the functions comprising the DMS Application Layer:

1. Many transactions can be used in multiple DMS applications, so in an effort to modularize the code and prevent duplication, one skilled in the art could envision how these transactions can be instantiated in DMS applications much like a logic designer instantiates circuit macros.

2. In larger DM systems where performance is a critical issue, it is frequently prudent to combine several smaller transactions into "macro" transactions. This is best performed by someone with intimate knowledge of the internal organization of the Control Repository. By separating the CR Access functions from the DMS applications, the end users can readily modify the DMS applications without acquiring the aforementioned knowledge.

An illustration of the above principles can be made using a translation from an API call down through multiple managers to the command translators.

Assume that "usera" wishes to set a "move" lock on "file1.type2.varx" at the "entry" level for the purpose of "MODEL BUILD". The user would invoke the API call "SetLock move file1 type2 varx entry "MODEL BUILD"". Referring to FIG. 8, the API call is represented(81). The state table(82) is used to convert the API call into invocations of the Authority Manager File Authority Check(83) and the Lock Manager SetLock (84) routines.

FIG. 9 depicts the Control Repository Interface (CRI) call(91) employed by the Authority Manager to perform the File Authority Check. This in generates the SQL transaction (92). In addition, FIG. 9a depicts the CRI call(93) employed by the Lock Manager to perform the lock set. This generates a sequence of three SQL transactions(95). It should be noted that all CRI calls are atomic, i.e. All SQL transactions in a CRI call must complete successfully. If one transaction fails, all previously completed transactions are backed out.

COMMAND TRANSLATORS

Our preferred embodiment also depicts all Control Repository Access functions to be written in a common generic form, adhering to the fundamental concept that all Control Repository information is organized in virtual tables. This also holds true for transactions that reference information residing in a Control Repository which is not physically implemented using tables. The COMMAND TRANSLATORS serve as the interface to the physical embodiments of the Control Repository.

An example of the above architectural principle is described herein. All CR Access functions are written as a series of add, modify, delete or extract operations in a SQL-based language that treats the information as if it were stored in SQL tables. If the underlying Control Repository is indeed a SQL database, the command translator passes the transaction to the database with little or no modification. However, if the information is organized in a flat file, the command translator would map the virtual table to the physical organization of the file.

Figure 6:
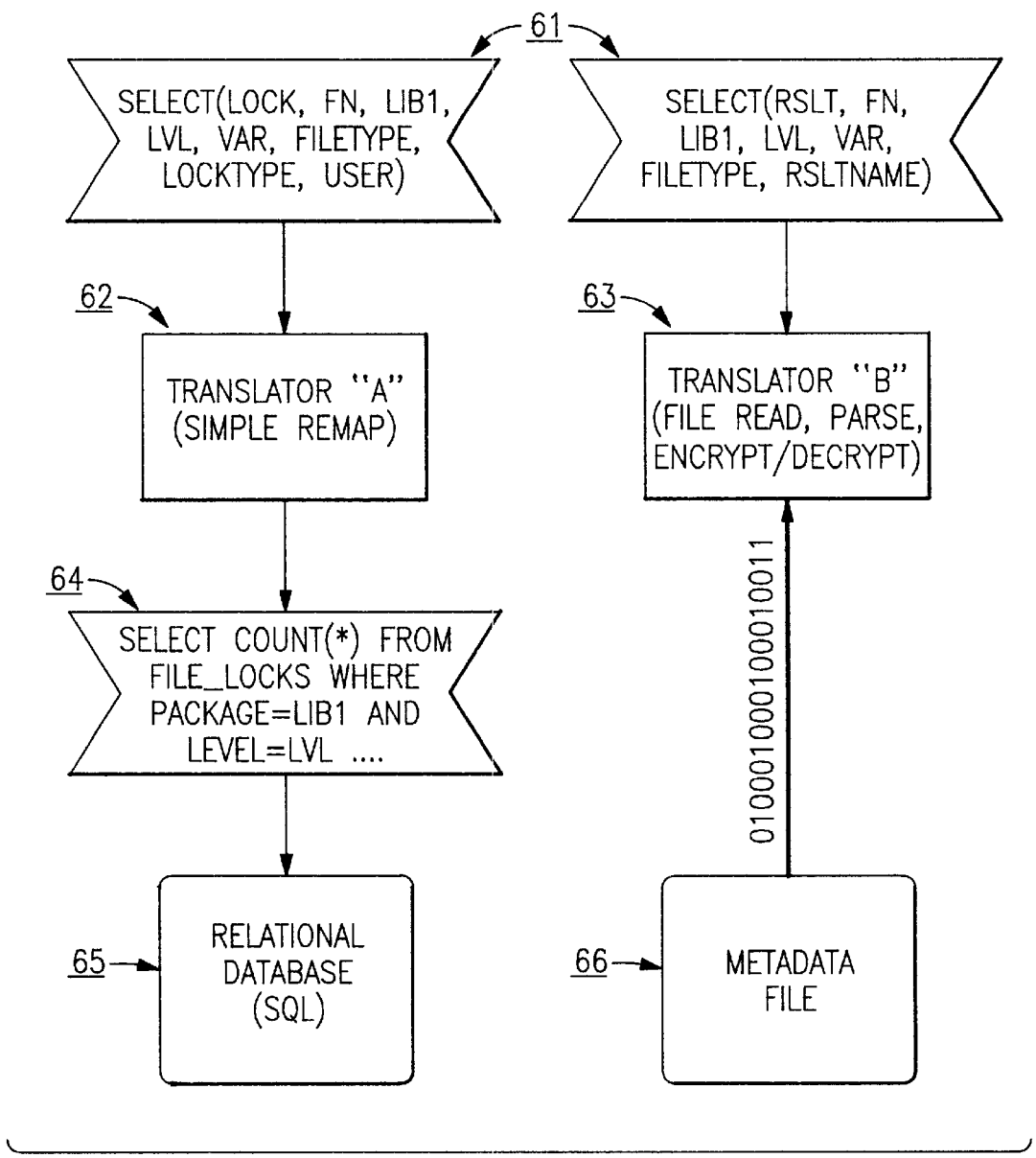
FIG. 6 depicts the detailed operation of the Command Translators introduced in FIG. 2.

FIG. 6 depicts a scenario where the virtual Control Repository is physically comprised of a SQL database (65) and an encrypted meta-data file (66). COMMAND TRANSLATOR A (62) simply passes the generic SQL-based transaction (61) to the SQL database after a simple modification into a true SQL transaction (64). Conversely, transactions destined for the meta-data file are sent to COMMAND TRANSLATOR B (63). Inside this translator, the met-data file is parsed using the proper decryption technique to locate the data that maps to the generic Control Repository information contained in the transaction. In the case of an add or modify operation, the new information is encrypted and embedded in the appropriate position within the file. This architectural approach permits information residing in existing meta-data, or non-DMS databases to be included as part of the centralized DMS Control Repository by simply writing a command translator to perform the mapping between the generic (repository independent) transaction and the interface to the physical repository.

Returning to FIG. 1, the present invention contemplates the use of the modular, scalable architecture illustrated in FIG. 2 through FIG. 9 to construct the Central Repository (18). The various pervasive computing and peripheral devices shown in FIG. 1 (10 through 17) contain DMS Applications (22) which can range from very simple "hardcoded" applications embedded in the RAM or ROM of a microcontroller or digital signal processor (DSP) to complex user interface applications comprising graphical user interfaces (GUI), web browsers, etc. The DMS Application running on the pervasive computing devices gather the appropriate PFVL information and launch a transaction. In the most common embodiment, the transaction is delivered to the Central Repository through the Client/Server Interface (23) via the communication services illustrated in FIG. 7.

SCENARIOS EXEMPLIFYING THE PREFERRED EMBODIMENT

The present invention can be employed in a hospital environment to automate and facilitate all aspects of patient care. Fortunately, most of the data found in said environment can exist in electronic format capable of being stored on a computer system. Typically this data emanates from a variety of disparate sources and is stored in a multitude of formats. Our invention enables all of this data to be automatically transmitted to a central DMS and organized using the PFVL paradigm. This allows the data to reside in a plurality of storage media and permits the flexibility of either importing all the data into a single physical repository such as a DB/2 relational database or dispense with the import/export operation and track the data in its original location.

Figure 10A:
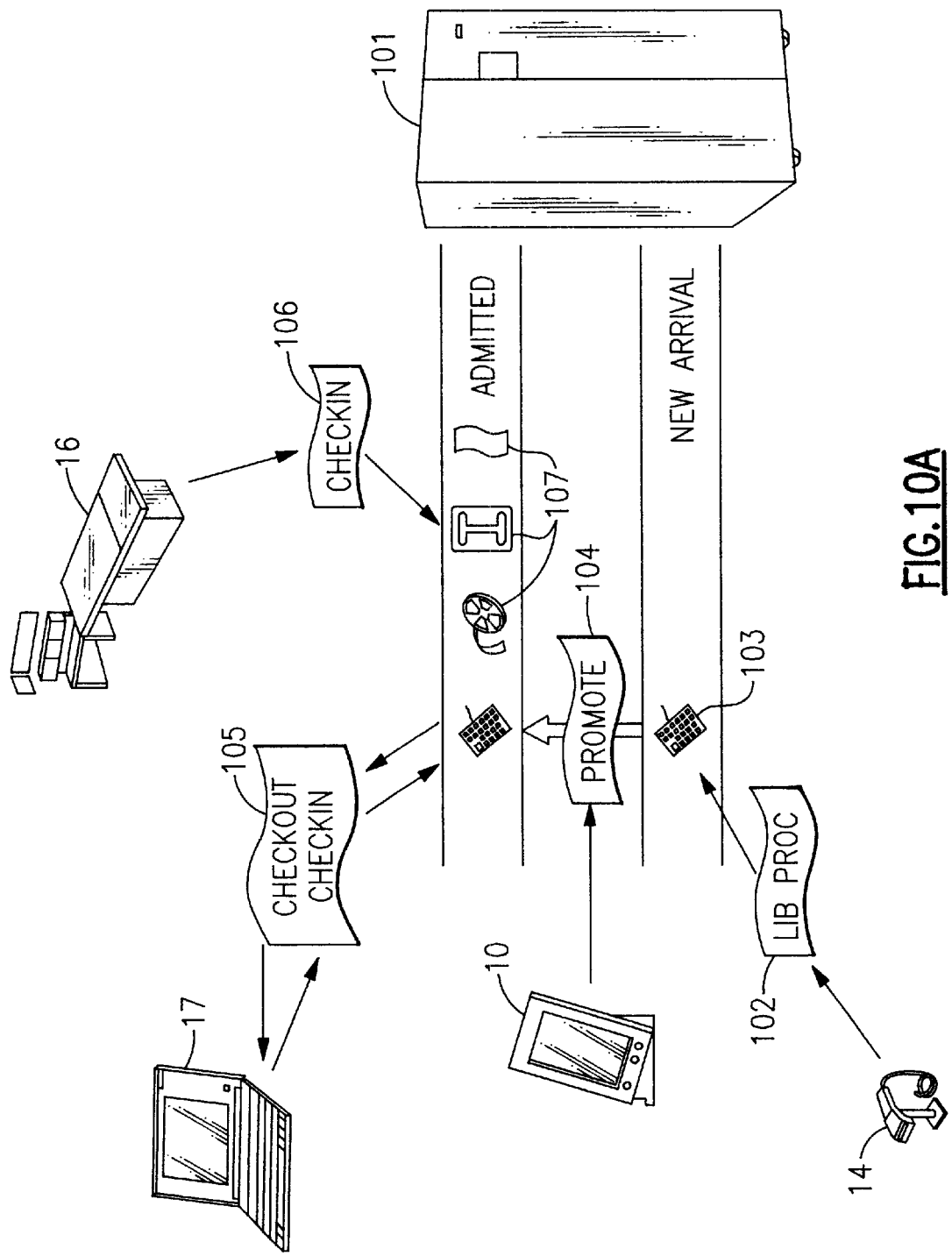
FIGS. 10A. 10B & 10C illustrates the present invention by way of an example

FIG. 10A depicts how our invention can be used to apply the PFVL paradigm to the patient's data to enable collection of the different data objects into a central repository. A virtual control repository (101) can be established with various levels such as NEW ARRIVAL, ADMITTED, and DISCHARGED. When the patient enters the hospital (whether it's for a scheduled admission or the emergency room), a bracelet with a bar coded patient id is attached. The patient id number is the primary PFVL attribute. A bar code scanner (14) initiates a LIBRARY PROCESS (102) which creates the patient's electronic chart (103) and checks it into the NEW ARRIVAL level. In addition, the LIBRARY PROCESS opens the patient's bill with the date and time he entered the hospital. The bar code scanner could be a conventional scanner connected to a personal computer via a serial or SCSI interface. At this point, the personal computer would execute a DMS application which would capture the bar code data stream and forward it to the DMS (101) as part of a Checkin Library Process. One can envision the DMS residing on a server and the personal computer interacting with it via a LAN, WAN, TCP/IP, modem, wireless or any other type of client to server connection.

Our invention further contemplates an advanced bar code scanner which interacts directly with the server using one of the aforementioned protocols. In this alternate embodiment, an embedded controller or DSP is programmed with a simple DMS application that transmits the patient ID information along with the necessary PFVL attributes.

If the patient is admitted, then at the time a room is assigned and transportation wheels him to his room, the orderly would use a device such as a palmtop (10) to allow the orderly to enter the information with the room number. This would trigger a PROMOTE REQUEST (104) to the ADMITTED level.

Once again, LIBRARY PROCESSING takes care of updating the bill to reflect the proper room charge. In addition, if the hospital is using a single database to manage everything, and the reception desk has access, then they can simply query the patient information to direct visitors to the patient's room. Otherwise, if they are using a separate system, the promote could also trigger a Library Process to update the reception desk's system with the new patient's room information.

Throughout the patient's stay, several diagnostic tests (X-Ray, MRI, CT-Scan, etc.) (16) may be run. Upon completion, the results are stored electronically in a disk or tape file. In a simplistic scenario, a computer connected to the disk or tape file can execute a DMS application to perform a CHECKIN (106) of the test results (107) into the Admitted level. An alternate embodiment contemplates embedded controllers within the equipment which could execute small DMS applications to automatically classify the test result data by PFVL and promote it directly to the ADMITTED level of the central repository on the server, bypassing the need for the external disk or tape file.

A more sophisticated embodiment would employ a storage medium such as disk or recordable CD-ROM with sufficient file management capabilities to permit the PFVL paradigm to be applied directly to the data while it resides in the disk or tape file. For example, a directory structure can be established using the Library, Level and Data Type as the branches of the directory tree.

In the case of a recordable CD-ROM, the directories could serve as temporary levels or staging areas where the data resides until a convenient time for uploading to the central server. In the case of a disk file, one could envision how the DMS architecture described in FIG. 2 can be used to adjoin both the physical repository containing the patient's chart, billing data, doctor's reports, etc. with the medical image results residing in the disk file. At this point the images have been electronically stored in the same central repository as the patient's other medical data, and can be retrieved in a consistent manner. In addition, daily diagnostic data such as heart monitoring and blood test results can also be uplinked and checked into (106) the central repository either directly using embedded controllers in the equipment or by portable computing devices carried by lab technicians.

Every time a doctor or nurse needs to update the patient's chart, they do it electronically using one of several means, depending on the amount and content of information they must enter. For example, someone simply taking vital signs could use a hand-held device such as a palmtop, whereas a nurse may sit down at a PC or laptop during change of shift to type up chart notes. Regardless of the device used, the action is the same. A CHECKOUT (105) is performed to ensure the chart is locked out and nobody else can edit it simultaneously. In the first case, the palmtop simply appends the vital signs with timestamp information to the chart. In the second case, the nurse's notes are also appended, but the nurse would also have access to the entire chart. In either event, once the new information is entered, a CHECKIN (105) stores the chart back into the ADMITTED level and release the lock. If necessary, revision control can also be used to create a history trail of updates.

FIG. 10B shows the DMS (101) expanded to include a DISCHARGED level. Once the doctor authorizes the patient's release by updating the electronic chart (103) using a personal computer (15), laptop or workstation, a client side DMS application initiates a promote request (104). The patient id and level name are the only required PFVL attributes, whereas the type is wild carded. This results in all the data associated with that patient's hospital stay being promoted to the DISCHARGED level. Library processing triggers the final bill to be tallied and sent to the patient. Any questions or disputes about the bill can be quickly handled because all of this data is accessible by a common means.

Figure 10C:
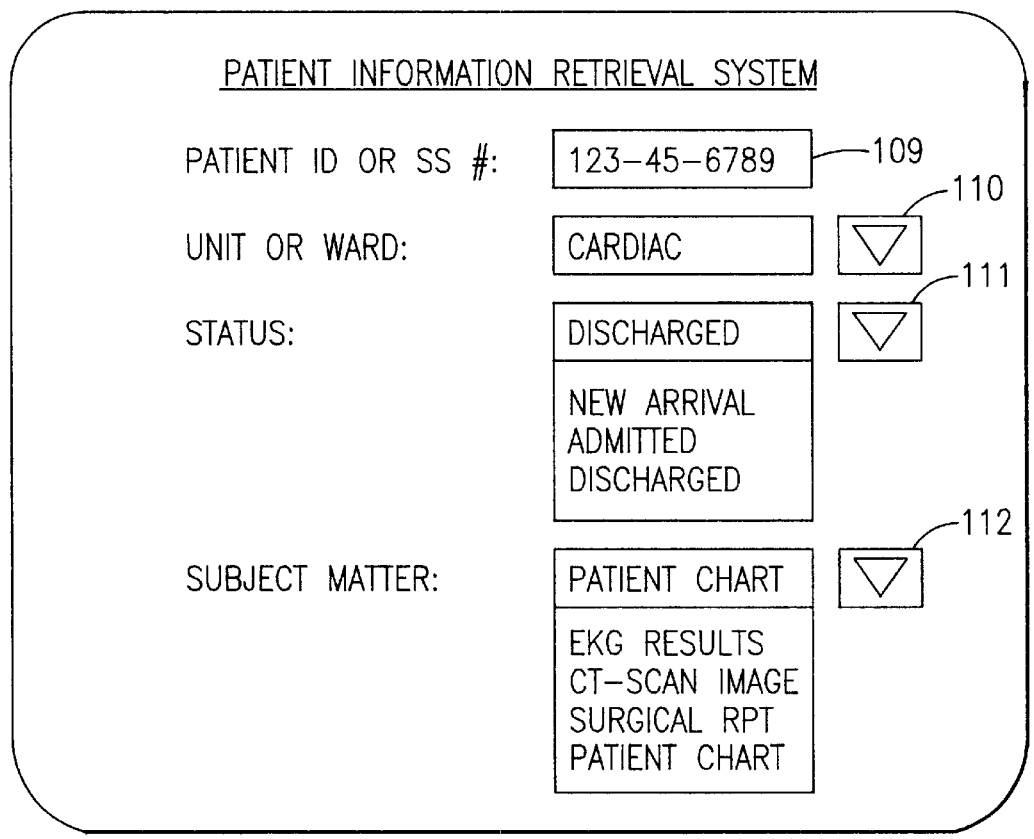

The advantages of our invention continue after the patient is discharged. A doctor, at any time, either in residence at the hospital, or working remotely, can access whatever data he needs. FIG. 10B illustrates a server (12) which could be used to initiate a LIBRARY SEARCH OR READ-ONLY CHECKOUT to access the patient's data. If the doctor is a resident of the hospital where the patient stayed, then the server (12) could be attached to the same network as the DMS. However, the doctor may also have a laptop or PC at home or the doctor may not be affiliated with that hospital. In this case the server (12) could be a web server or remotely accessible server, which would permit the same access using applicable security methods. FIG. 10C depicts an entry screen which could be an independent DMS application or implemented with HTML or Java for use over the world wide web. The PATIENT ID field (109) can be filled in or left blank, the UNIT OR WARD field (110) is implemented with a drop-down menu to select the Package (Library). The STATUS field uses a drop-down menu to select the Level and the SUBJECT MATTER field also uses a drop-down menu to select the type of data. These fields directly map to PFVL attributes which drive the Library Search and the Read-Only checkout. One skilled in the art can envision how any of these fields can also allow a selection of ALL which results in that PFVL being wild carded. For instance he could request a read-only checkout of the patient's chart, latest heart monitor results, and the images from yesterday's cardiac catheterization.

The advantages of the present invention are numerous. Since the PFVL paradigm acts as the "glue" to hold everything together, each device only needs to know how to work with it's own type of data. Assume that DB2 is chosen as the main repository, the remote devices such as the MRI machines, heart monitors and palmtops don't need to run a copy of DB2 or understand SQL. They simply need a means for connecting to the server and transmitting a simple check in request along with the data they are uplinking. One only needs to write a small embedded application program to create the check in request and upload the data. If the underlying DB2 database changes next year or is replaced by an Oracle database, it doesn't affect the remote devices.

Furthermore, the central repository can be distributed across multiple systems or contained within a single system. In some cases a large system such as the latest release of DB2/Universal running on an S/390 could possibly manage all the necessary types of data (patient's chart, test results, images, billing, etc.). However, there may also be situations where the repository is distributed throughout a cluster of servers, perhaps running a combination of Windows NT, Unix and S/390. Some of the data may reside in a true database, while the remainder may simply exist as files in directories. Our invention works independently of the platform so one can envision the entire repository consisting of file servers, databases, personal computers (workstations), palmtops, laptops, web servers, storage media attached to Although this invention was illustrated using a hospital example, one can envision the same concepts being applied to other areas such as a manufacturing environment. Consider the following company which exemplifies a typical manufacturing scenario. Raw materials or parts are procured from suppliers and received into inventory. Often these materials or parts need to be inspected for quality assurance. These parts and materials are then made available to both engineering and manufacturing. During assembly they are incorporated into finished products which must be shipped and distributed.

Figure 11A:
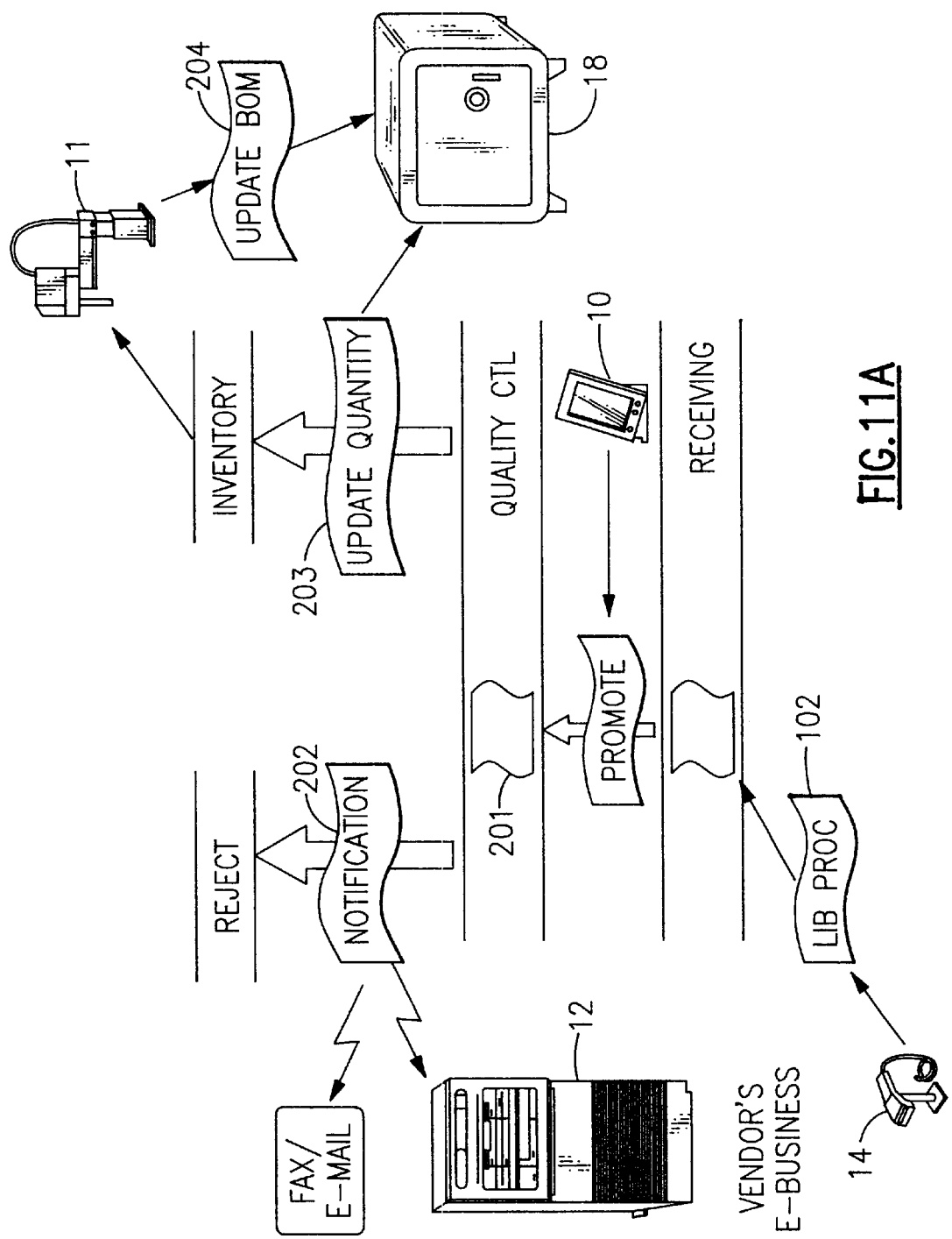

FIG. 11A illustrates such a manufacturing environment consisting of a multi-leveled Central Repository (18) comprised of a RECEIVING level, a QUALITY CONTROL level, an INVENTORY level, and a REJECT level. Our invention demonstrates how the parts and raw materials can be entered into a centralized data management system upon arrival at the receiving dock. Bar code scanners or similar portable devices (14) could be utilized by loading dock employees to classify the parts and materials by PFVL and execute a small Library Process (102) to create an electronic invoice (201) in the RECEIVING level. When it comes time to inspect the parts for quality assurance, the parts are transported to the QA area. At that time a hand-held computer (10) such as a palmtop can be used to promote (104) the invoice to the QUALITY CONTROL level. Our invention even contemplates an automated transportation system whereby the transportation equipment itself could initiate the promote request upon delivery of the items to the Quality Assurance area.

As the QA inspectors pass or reject the raw materials, they can enter their results into palmtops, laptops or similar devices. Goods that fail QA can be promoted into a REJECT level where several actions may be triggered via Library Processing. For example, the carrier (i.e. UPS) could be automatically notified (202) to come and pick up the defective parts for return to the supplier. Additionally, a fax or e-mail could be automatically sent to the supplier informing them of the pending parts return and requesting replacement parts or credit. The parts that pass QA can be promoted into the INVENTORY level where an UPDATE QUANTITY (203) Library Process can update the Control Repository (18) with the new quantity of parts now available in INVENTORY. Further benefits are derived from the PFVL paradigm because the INVENTORY level can also contain additional information beyond that pertinent to the parts just received. For instance general information such as design specifications, data sheets, price & sales data, drawings, images, etc. can all coexist at this level. These objects may exist as HyperText Markup Language (HTML) files, Portable Document Format (.pdf) files, graphics files in JPEG, AutoCad, Bitmap or other forms, or information stored as fields in a database. Regardless of its location, application of the PFVL paradigm permits uniform access to all of the data.

Our invention further contemplates how engineers can reference information about the parts and raw materials from the INVENTORY level to create the drawings and specifications for their company's products. During manufacturing of the products, a robotic assembly line (11) procures the parts from inventory. As they do, embedded controllers in these robots initiate transactions which update the inventory quantities as the parts and raw materials are depleted. In addition, CONFIGURATION MANAGEMENT allows the embedded controllers to spawn transactions which UPDATE THE BILL-OF-MATERIALS (204) for the product undergoing assembly. When the product is completed, a corresponding hierarchical Bill-of-Materials will exist which shows every subsystem in the product, and every vendor part in each subsystem. FIG. 11B shows one such Bill of Material list (205) indicating five components whereby three of them are from various RELEASE levels of the DESIGN Library, and two of them are from the INVENTORY level of the PARTS Library. It should be noted that the modular Data Management System described in FIG. 2 permits a plurality of storage engines to comprise a single Central Repository. This is illustrated by the fact that components in the DESIGN Library have revision control numbers applied while components from the PARTS Library uses simple reference numbers for tracking.

One benefit of practicing these data management methods is this information can be analyzed using data mining software to predict the effect of future changes such as a price increase of a frequently used vendor component. The company would be able to ascertain exactly which and how many of their products use a particular component, obtain sales data, and decide whether the products have enough profit margin to absorb the price increase, whether the increase needs to be passed on to the consumer or whether a replacement vendor component needs to be found.

These same principles can be further applied to finished products which require distribution and shipping. As the products complete assembly, they can be promoted into an IN STOCK level similar to the INVENTORY level in FIG. 11 A. Several actions can occur depending on the type of company. If it's a mail-order house, telephone sales agents can perform LIBRARY SEARCHES for products at the IN STOCK level to determine whether the product is available for shipment to the customer. When the customer places an order, the product could be promoted to a SHIPPED level which triggers LIBRARY PROCESSES to initiate the shipment of the product (i.e. arrange for transportation of the product to the shipping area, contact Federal Express for pick-up, etc.), and generate an invoice to be billed to the customer. In cases where the finished products are shipped directly to retailers, promotion to this SHIPPED level can enable a transaction to be sent to the retailers' Data Management System to inform them that the arrival of new products are pending. Our invention contemplates the use of the PFVL paradigm as the basis for the retailers' Data Management system such that the two systems can work in conjunction to track the products. This is just one example of how potentially disparate systems between a supplier and customer can be linked to form a tightly coupled e-business relationship.

Figure 12A:
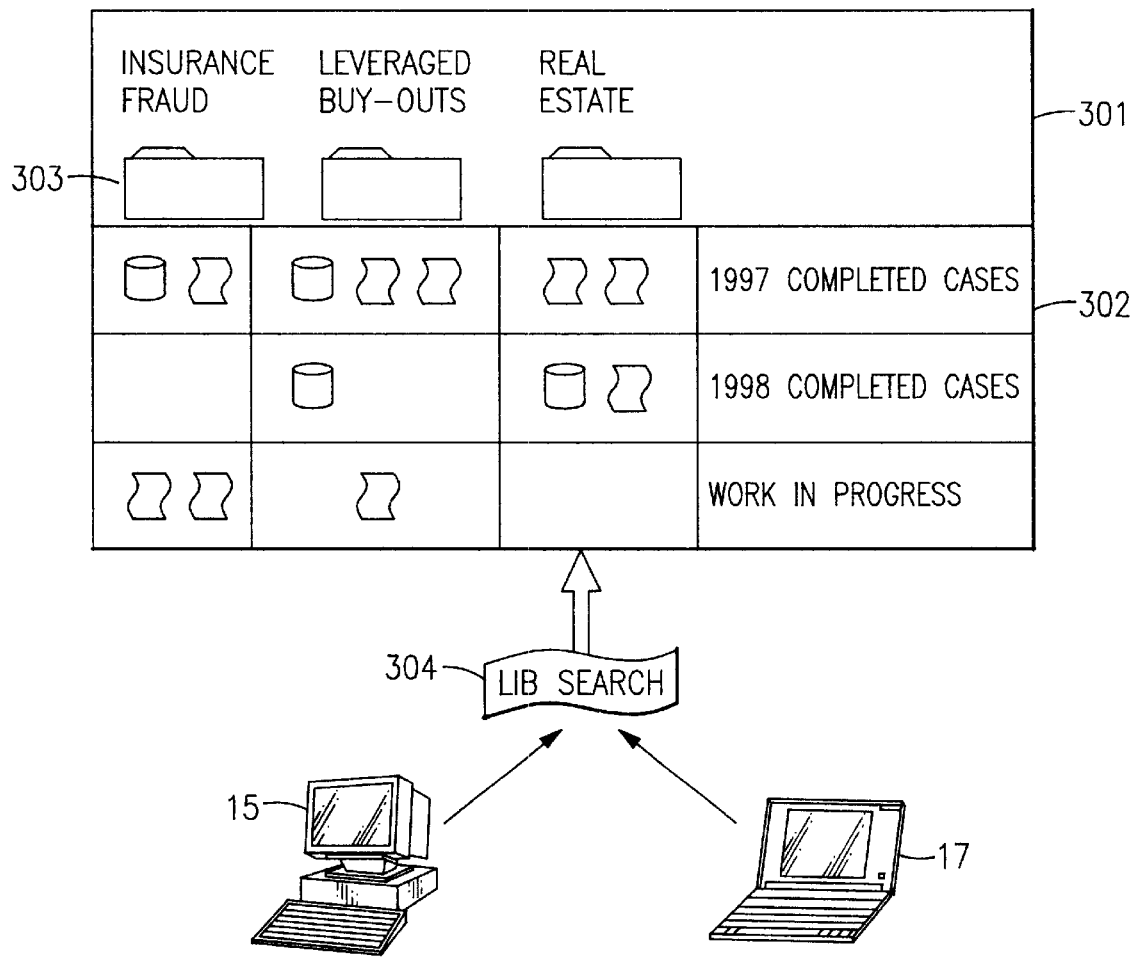
FIGS. 12A, 12B & 12C depict a remote or mobile computing environment employing various features of the present invention. manufacturing environment.

Turning our attention to a different scenario involving remote and mobile computing, the present invention offers several methods for improvement. For instance, applying the PFVL paradigm to the data stored in a Notes database permits library searches to retrieve desired data and filter out unwanted data. FIG. 12A illustrates a replication scenario involving an attorney using Notes with our invention applied. The PFVL paradigm is used to categorize the data objects stored in the Notes database by type. The Notes database serves as the PACKAGE (301) (or Library) having multiple LEVELS (302) such as WORK IN PROGRESS, 1997 COMPLETED CASES, and 1998 COMPLETED CASES.

The attorney's data is organized into Notes FOLDERS (303) such as INSURANCE FRAUD, LEVERAGED BUY-OUTS and REAL ESTATE. The attorney has a personal computer (15) in his office which is his primary client. When the attorney wants to work on a case at home on his laptop (17), he can perform a replication comprising a LIBRARY SEARCH (304) of all of his WORK IN PROGRESS for all existing folders. Our invention also contemplates the continued ability to selectively include or exclude folders from replication to further restrict the replication to work in progress for a specific folder. On the other hand, if he only needs to reference a completed case, he can start his search at 1998 COMPLETED CASES without the need to replicate all of his WORK IN PROGRESS.

Furthermore, since the PFVL paradigm is independent of the underlying storage engine, it can be applied to the data inside and outside of Notes. For example, the attorney may have a case comprising documentation in many different forms. There may be numerous memos, e-mail and Notes documents stored within Notes' folders, but there may also be attachments such as WordPro documents that were detached and stored in a directory structure outside of Notes (i.e. C:\LOTUS\WORK\WORDPRO). There may even be data such as bitmaps derived from scanned paper documents or images generated by digital cameras, which are part of the case, but not necessarily part of the Notes database. Regardless of where these objects are physically stored, the Notes database can still be used as a Control Repository to manage the PFVLs associated with these objects. Hence the WordPro document and scanned bitmap image can still be attributed with the same case identifier and level (i.e. WORK IN PROGRESS) as the real Lotus Notes data. This permits replication to use the PFVL to search for and extract any type of data the attorney needs regardless of its physical location. Replication can further be enhanced to permit the data to be filtered by type, once again preventing unwanted data (such as sizable bitmaps) from being replicated.

Figure 12B:
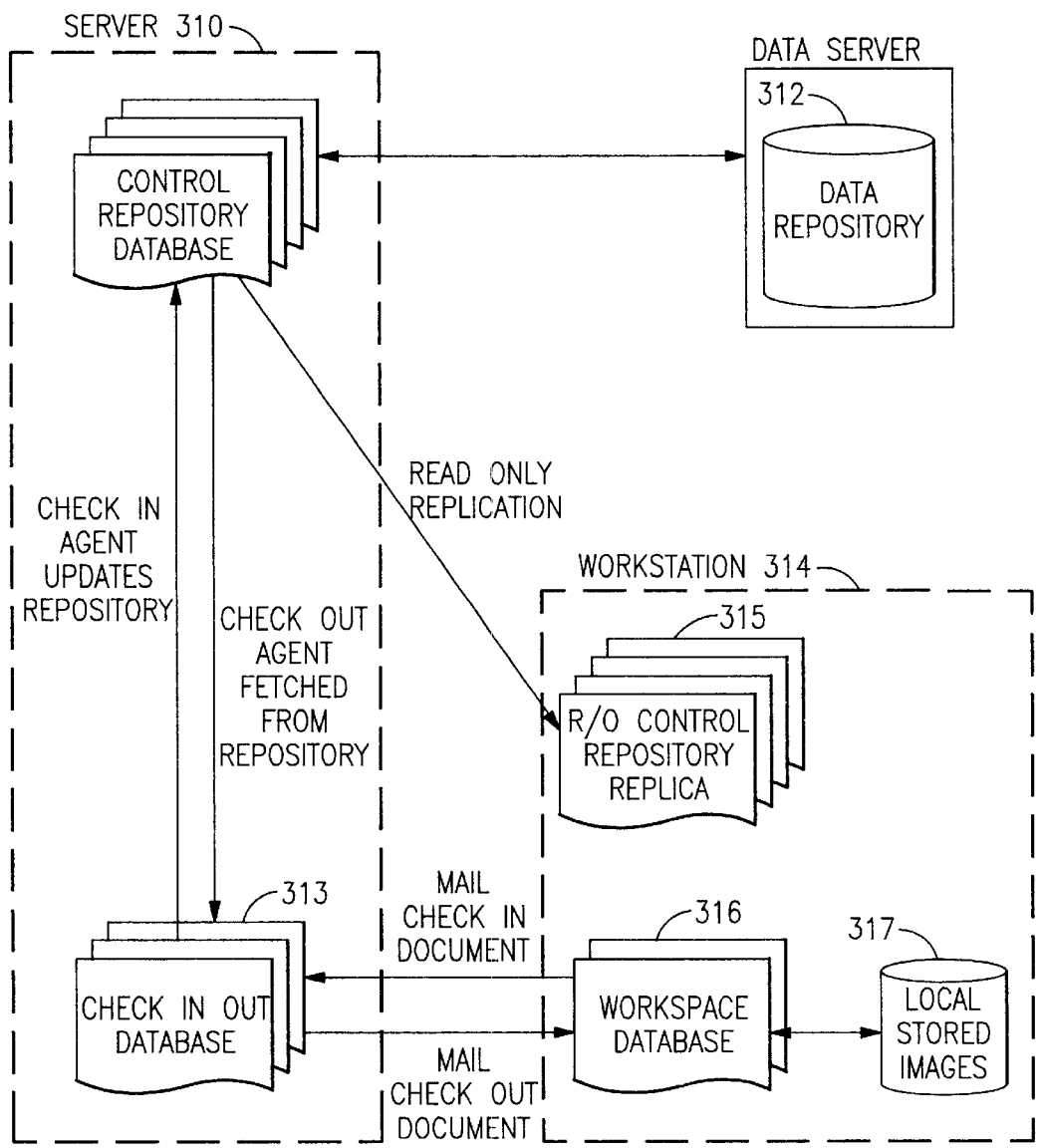

FIG. 12B illustrates this concept in greater detail. The central repository exists on the SERVER (310), which is comprised of a CONTROL REPOSITORY DATABASE (311), a CHECK IN OUT DATABASE (313) and a DATA REPOSITORY (312) which could exist on the same server as a central repository or on a separate data server. The user's remote Workstation (314) contains a WORKSPACE DATABASE (316), storage space for any external data (317), and an optional READ ONLY CONTROL REPOSITORY (315).

To access or modify a data object(s), the user selects the object(s) from either the Server (310) or the local replica copy of the Control Repository (311) and invokes the CHECK OUT DMS application. In the case of Lotus Notes, this application can be implemented as an AGENT. The AGENT will mail a CHECK OUT request to the Check In Out Database (313) which checks for existing Lock documents. If there are none, an OUT FOR UPDATE Lock document is created to prevent duplicate checkout. Finally, a copy of the selected data object(s) is mailed to the Workspace Database (316).

Upon completing modifications of a checked out object, or upon creation of a new object, the user initiates a CHECK IN action which mails a copy of the object(s) to the Check In Out Database (313). For any objects residing outside of the Workspace (316) in the local storage space (317), the CHECK IN DMS application would also attach the files to a document contained within the database. For example, an attorney's brief might be a document residing within the Workspace Database while images created by a digital camera may reside on a local hard drive. Upon receipt of the mailed copy, the Check In Out Database (313) runs the CHECK IN DMS application which is implemented as a Lotus AGENT. This agent creates a document representing the attorney's brief in the Control Repository (311) at the WORK IN PROGRESS level, and detaches any external files (such as images) into the Data Repository (312). Files in the Data Repository (312) are tracked using pointers in the Control Repository (311) documents. Furthermore, AGENTS can also execute Library Processing to perform automated tasks such as data translation or checking. Additionally, the Check In Out Database (313) serves as an Automated Library Machine (ALM) and our invention contemplates a plurality of these ALMs serving users of large data management systems.

Figure 12C:
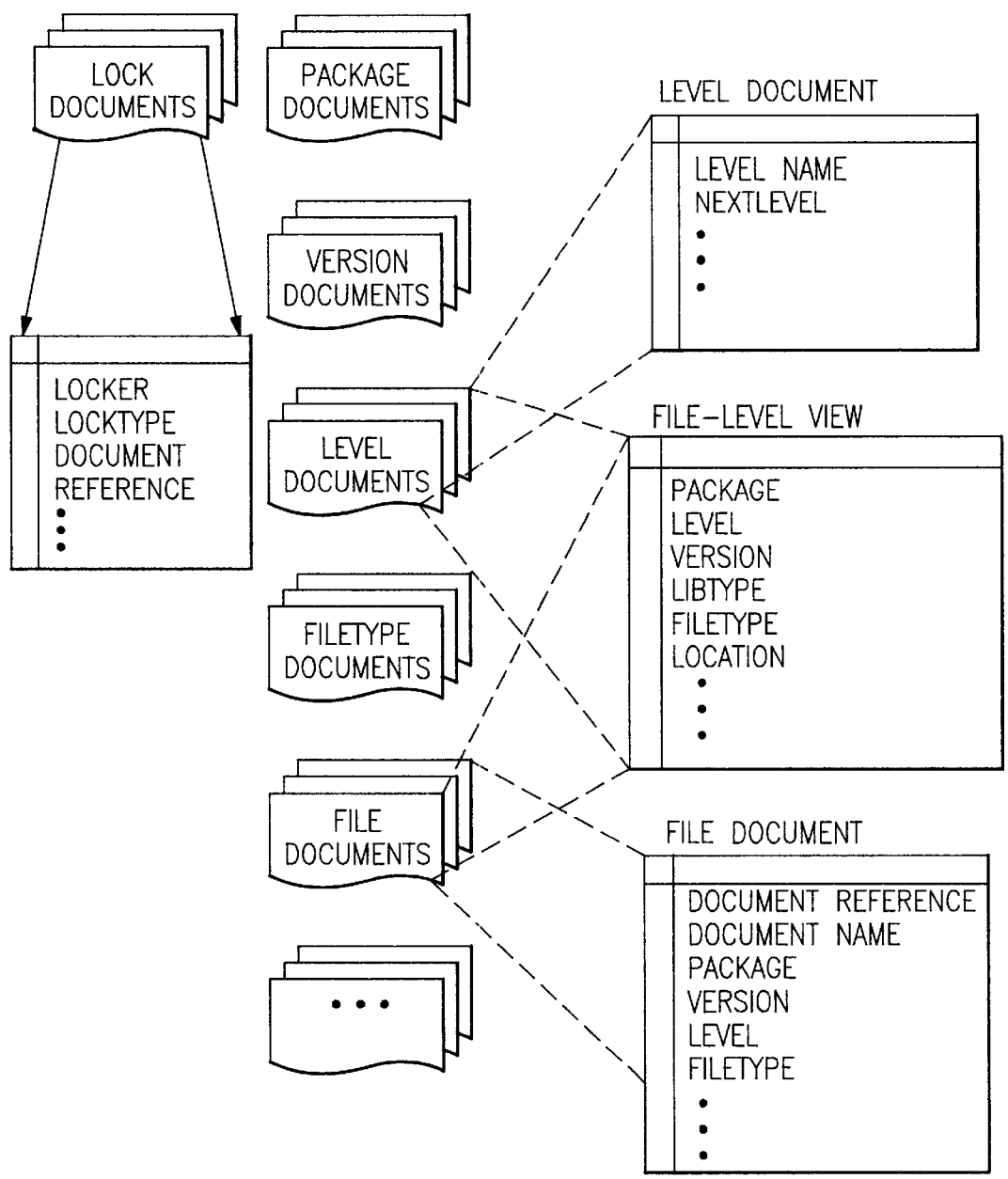

FIG. 12C depicts how the Package, FileType, Variance, Level, and Version attributes are mapped into the Lotus Notes environment using databases, documents and document fields. Although the aforementioned example uses Lotus Notes to illustrate the principles contained herein, one skilled in the art can appreciate how these concepts along with other concepts such as Configuration Management, Part Number and Release Management, Fix Tracking, and Library Processing can be further implemented using Lotus Notes or any other remote computing or groupware product employing a means of embodying a program of instructions. One can also appreciate how these concepts can be realized in simpler applications such as spreadsheets which provide the capability to enter data tabular format and perform sort and search operations on the fields.

In addition to the PFVL paradigm, various aspects of the S.O.M.A. architecture can be employed within applications such as Lotus to improve mobile computing. Presently, replication assumes the user wants the data to permanently reside on the client. This assumption is probably valid for WORK IN PROGRESS data since the user desires to keep this data in sync between a plurality of computers (i.e. home and office) so the data can be locally accessed from either location. On the other hand, if data only needs to be referenced on a temporary basis, such as data residing in the 1997 COMPLETED CASES level, our invention provides a means to reclaim the storage space on the client device.

The present invention demonstrates such means whereby replication employs the concepts governing check-outs, promotion, and private libraries to permit different actions on the client side. For instance, work in progress would be checked out such that if the attorney makes any edits, the data would be flagged for pending "promotion" back into the work in progress level during the next replication. This way the edits materialize back into the server and will be propagated to other clients in future replications. On the other hand, the referenced data from the 1997 completed cases could be checked out read-only. Data flagged in this manner can be safely deleted from the client without a corresponding delete action occurring on the server. One skilled in the art could see how replication could be further improved to ask the user to enter an expiration date for read-only checkouts such that the data is automatically expunged from the client after the elapsed time.

The advantages offered by the our invention are presented by way of a further comparison with the current art. One can envision how the aforementioned level structure can be beneficial as PROMOTION can be applied to allow data to traverse through different phases of a project or program and eventually retire in a final resting place. In the above example, once a case is finished, all the data associated with that case would be promoted into one of the COMPLETED levels. Although, one could attempt to mimic this using folders in the present art, it would be awkward. For instance, if the attorney has cases "in progress" for insurance fraud, leveraged buy-outs and a real estate deal, he would either have to combine all the cases into one folder labeled WORK IN PROGRESS or create three folders labeled INSURANCE FRAUD WORK IN PROGRESS, BUY-OUTS WORK IN PROGRESS and REAL ESTATE WORK IN PROGRESS. If the user wants to replicate all of his work in progress he must remember to select all three folders for replication. The problem increases if multiple users want to share the same data.

The present invention would execute a replication method utilizing the CHECK IN/OUT DATABASE depicted in FIG. 12B. The user would be able to control the amount of data replicated by using a combination of PFVL attributes (Package, Level, Type) and folders. This improvement on the present art permits the user to efficiently access, for example, all "work in progress" or only a subset of those cases. If the user desires read-only access, the data can be checked out and flagged for deletion. On the other hand, if the user intends to update the data, a full checkout can be performed which enables the LOCK MANAGER shown in FIG. 2 to establish ownership for the data and prevent other users from making simultaneous updates.

The application of our invention to the remote computing environment introduces new opportunities for pervasive devices. The remote device can execute a small DMS application to initiate a connection to the Notes server and query the type of data it's designed to process. For example, very simple devices such as PDAs or electronic organizers could perform a checkout of e-mail or to-do lists. In very low-end devices with limited data entry capability, the user would checkout the data in a read-only fashion just to browse information. The higher end devices such as palmtops, which permit data creation and editing, would contain a slightly more sophisticated DM application which permits checkout-for-edit and promotion of the updated data back to the Notes server.

Non-computer devices such as pagers, cell phones, digital cameras, music and video equipment could also interact with the Notes server in a similar fashion. For example, a pager or cell phone could connect to the Notes database and query a phone number from the address book. A digital camera could promote its photos into the repository. A midi keyboard could checkout midi files from a music library residing in a Notes database. A pocket tape recorder using an embedded version of IBM ViaVoice could permit the user to dictate a memo and then promote the resulting document into the repository.

Our invention offers the advantage that a remote device doesn't need to run the same application being used to implement the repository (Notes, SQL, Oracle, etc.). The device contains a very simple embedded application program which establishes a connection to the repository, initiates queries, checkouts, promotes, etc. and processes the data. These functions can easily be accomplished using an embedded controller, DSP or specialty ASIC. Because the hardware requirements are so paltry, virtually any remote device can participate.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A method for enabling a central data management system to interact with a pervasive computing device, comprising the steps of providing a common access protocol for enabling any pervasive computing device capable of executing a control program tangibly embodying a program of instructions to interact with a centralized data management system, and providing a commonly accessible data management system which possesses a plurality of data managers for data residing in a data repository managed by a virtual control repository, wherein said data management system possesses a plurality of data managers, and the method further comprises the steps of providing said plurality of data managers in one or more layers of a layered architecture, and performing with a data manager and with a user input via an API a plurality of processes on data residing in heterogeneous data repositories of computer system including promotion, check-in, check-out, locking, library searching, setting and viewing process results, tracking aggregations, and managing parts, releases and problem fix data under management control of a virtual control repository having one or more physical heterogeneous repositories, and storing, accessing, tracking data residing in one or more said data repositories managed by said virtual control repository.

2. The method according to claim 1 wherein any type of data generated, captured, manipulated or otherwise transmitted by said pervasive computer devices can be mapped into a package, Filetype, variance and a PFVL Level whereby within a variance there exists one or more data objects of a given type residing at one or more levels with one or more versions.

3. The method according to claim 2 wherein packages are hierarchical and contain other Packages, and wherein a given package can contain any combination of data objects and/or packages.

4. The method according to claim 1 wherein said data management system comprises a plurality of data managers are configurable and can be dynamically or statically combined as modules of a scalable system ranging up to a high-end enterprise wide DMS.

5. The method according to claim 1 wherein is provided a User Interface Layer for interaction with said pervasive computing devices via said API which enables mapping of a methodology, process, use-model or environment into a generic PFVL paradigm using tools which can be manipulated by said user, including industrial robots, palmtop computers, bar code scanners, medical diagnostic equipment, cellular telephones, pagers, digital cameras, electronic organizers, laptop computers, audio/video dictation and recording devices, menus, GUIs, and Web Browsers.

6. The method according to claim 1 wherein is provided with one or more DMS application layers which contains utilities that a pervasive computing device requires to interact with the DMS processes of promotion, check-in, checkout, locking, library searching, setting and viewing process results, tracking aggregations, and managing parts, releases and problem fix data.

7. The method according to claim 6 wherein said DMS application layers contain applications, each of which is composed of one or more application modules which interact with the data managers in one or more ways of interaction including:

non-manager interaction;

single manager interaction;

multiple manager interaction; and control repository access coupled with manager interaction.

8. The method according to claim 7 wherein said DMS applications and data manager functions can be accessed by pervasive computing devices using a common API based on the PFVL paradigm whereby all functions require a minimum of Package, Filetype, Variance, and Level but may permit additional optional parameters, and any combination of wild cards or placeholder characters may be used on any of the parameters.

9. The method according to claim 1 wherein data is stored in one or more data repositories constructed with one or more tools including simple directory trees, commercially available PDMs (storage engines), and the WWW and each repository may employ a common or unique storage and data access method.

10. The method according to claim 9 wherein each data object is classified by PFVL and unique File Reference regardless of the physical data repository in which the data object resides.

11. The method according to claim 9 wherein one or more of said data repositories resides completely or partially within the pervasive computing device.

12. The method according to claim 1 wherein said virtual control repository's physical repositories consist of repositories selected from the group of: relational databases, object oriented databases, flat files, table formatted files, Lotus Notes databases, any application capable of handling data in tabular format such as spreadsheets, meta data files and proprietarily formatted files and said Control Repository classifies all data according to the PFVL paradigm.

13. The method according to claim 1 further comprising a scalable client/server interface permitting the DMS to use local services to run in a client-only mode on the pervasive computing device and permitting a combination of local & remote services to run in a fully secure distributed client/server mode.

14. The method according to claim 1 wherein command translators are employed to map generic SQL-based virtual control repository transactions into any required command interface needed to interact with the corresponding physical implementation of said virtual control repository.

15. The method according to claim 1 wherein said pervasive computing devices communicate with said data management system using a variety of protocols such as TCP/IP, token ring, ethernet, Bisync, RS-232, HTTP, DCE, wireless, infrared, optical or any protocol capable of establishing a connection between a multitude of computing machines and transferring digital data streams.

16. The method according to claim 1 wherein disparate pervasive devices interact with a plurality of data management systems to exchange data in an e-business environment.

17. The method according to claim 1 wherein remote computing devices employ the PFVL paradigm to perform synchronization of data between a centralized data management system residing on a host system and localized replicas residing on one or more remote computing devices.

18. The method according to claim 17 wherein pervasive computing devices with limited data entry, storage, I/O, or memory capabilities can participate along with traditional remote computing devices such as laptop or notebook computers in a synchronization or replication environment.

* * * * *